United States Patent
Wakizaka et al.

(10) Patent No.: US 9,568,647 B2
(45) Date of Patent: *Feb. 14, 2017

(54) OPTICAL FILM HAVING ANTISTATIC LAYER, POLARIZING PLATE, AND IMAGE DISPLAY DEVICE

(71) Applicant: FUJIFILM Corporation, Tokyo (JP)

(72) Inventors: Daiki Wakizaka, Kanagawa (JP); Takayasu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 14/163,363

(22) Filed: Jan. 24, 2014

(65) Prior Publication Data

US 2014/0141235 A1    May 22, 2014

Related U.S. Application Data

(62) Division of application No. 12/923,093, filed on Sep. 1, 2010, now Pat. No. 8,673,182.

(30) Foreign Application Priority Data

Sep. 2, 2009  (JP) .................................. 2009-203144

(51) Int. Cl.
  *G02B 1/111*  (2015.01)
  *H01B 1/00*   (2006.01)
  *B32B 5/16*   (2006.01)
  *G02B 5/30*   (2006.01)
  *G02F 1/1335* (2006.01)

(52) U.S. Cl.
  CPC .............. *G02B 1/111* (2013.01); *G02B 5/305* (2013.01); *G02B 2207/121* (2013.01); *G02F 1/133528* (2013.01); *G02F 2202/22* (2013.01); *Y10T 428/25* (2015.01); *Y10T 428/31533* (2015.04)

(58) Field of Classification Search
  CPC ..... G02B 1/11; G02B 5/305; G02B 2207/121; Y10T 428/25; G02F 1/133528; G02F 2202/22
  USPC ....................................................... 252/500
  See application file for complete search history.

(56) References Cited

U.S. PATENT DOCUMENTS

| 5,300,575 A | 4/1994 | Jonas et al. |
| 7,968,177 B2* | 6/2011 | Iwata .................. G02B 5/0226 252/500 |
| 2006/0076541 A1 | 4/2006 | Yoshida et al. |
| 2006/0198021 A1* | 9/2006 | Fukuda .................... G02B 1/11 359/487.05 |
| 2006/0202171 A1 | 9/2006 | Yoshida et al. |
| 2009/0220796 A1 | 9/2009 | Kato et al. |
| 2010/0047624 A1 | 2/2010 | Yofu et al. |
| 2010/0136329 A1 | 6/2010 | Kato et al. |
| 2011/0135939 A1* | 6/2011 | Isaji ....................... C08G 65/18 428/428 |

FOREIGN PATENT DOCUMENTS

| EP | 0440957 B1 | 12/1990 |
| JP | 2003-176405 A | 6/2003 |
| JP | 2004-091618 A | 3/2004 |
| JP | 2005-196122 A | 7/2005 |
| JP | 2006-131873 A | 5/2006 |
| JP | 2006-176681 A | 7/2006 |
| JP | 2006176681 A * | 7/2006 |
| JP | 2008-007651 A | 1/2008 |
| WO | 2006/088204 A1 | 8/2006 |
| WO | 2006/095595 A1 | 9/2006 |
| WO | 2010/013660 A1 | 2/2010 |

OTHER PUBLICATIONS

Notice of Reasons for Rejection issued by the Japanese Patent Office on Jun. 11, 2013 in Japanese Patent Application No. 2009-203144.

* cited by examiner

*Primary Examiner* — Mark Kopec
*Assistant Examiner* — Danny N Kang
(74) *Attorney, Agent, or Firm* — Jean C. Edwards, Esq.; Edwards Neils LLC

(57) ABSTRACT

An optical film includes a transparent support and at least one antistatic layer formed from a composition containing an electrically conductive polymer, a polyfunctional monomer having two or more polymerizable groups, at least one compound selected from a compound represented by the formula (1) as defined herein, a compound represented by the formula (2) as defined herein and a trivalent phosphorus compound, and a photopolymerization initiator.

17 Claims, No Drawings

OPTICAL FILM HAVING ANTISTATIC LAYER, POLARIZING PLATE, AND IMAGE DISPLAY DEVICE

CROSS-REFERENCE TO RELATED APPLICATIONS

This patent application is a divisional patent application of U.S. patent application Ser. No. 12/923,093, filed Sep. 1, 2010, which claims the benefit of Japanese Patent Application No. JP 2009-203144, filed Sep. 2, 2009, the contents of which are hereby incorporated by reference in their entirety.

FIELD OF THE INVENTION

The present invention relates to an optical film having an antistatic layer, a polarizing plate using the optical film, and an image display device using the optical film or the polarizing plate on the outermost surface of the display.

BACKGROUND OF THE INVENTION

In the fields of optics, precision machines, building materials, home electronics and so forth, lamination of a film having an antistatic ability is supposed to be useful for the purpose of preventing dust attachment, electric circuit failure and the like. Above all, in the field of home electronics, from the standpoint of preventing dusts or avoiding a failure during panel fabrication, an antistatic property is required of the protective film applied to an image display device such as a cathode ray tube (CRT), plasma display panel (PDP), electroluminescent display (ELD) and liquid crystal display (LCD).

In addition to the antistatic property, various functions such as glare prevention, antireflection, hardcoat performance and antifouling property are sometimes required of the protective film of the above-described image display device, and it is important to satisfy these functions all at the same time.

As for the method to impart an antistatic performance to an optical film used in an image display device, an antireflection film having a layer where electrically conductive inorganic metal oxide particles are dispersed in an organic binder has been conventionally known (see, JP-A-2005-196122 (the term "JP-A" as used herein means an "unexamined published Japanese patent application")). However, the refractive index of an electrically conductive particle conventionally used in general is as high as approximately from 1.6 to 2.2 and therefore, when an inorganic metal oxide particle is used in an optical film, the refractive index of the layer containing such a particle is increased. The increase in the refractive index of the layer may allow for occurrence of unintended interference fringe due to a difference in the refractive index from an adjacent layer or may cause a problem such as intensified tint of the reflected color.

On the other hand, an electrically conductive polymer is known as an electrically conductive material replacing the inorganic oxide particle. For example, a polythiophene containing a polyanion has been developed as the electrically conductive polymer, and a technique of forming an electrically conductive film using the polymer is disclosed (European Patent No. 440,957). This electrically conductive film is not high in the refractive index as compared with an inorganic fine particle-containing antistatic film, but because the film is formed of an electrically conductive polymer alone, the strength of the coat is weak and its application as a protective film has a problem.

To cope with this problem, a coating film composed of an electrically conductive polymer and a curable binder is disclosed (JP-A-2004-91618 and JP-A-2006-176681). However, such a technique is disadvantageous in that the durability such as light resistance, heat resistance and wet heat resistance, particularly light resistance, is poor and the electrical conductivity is significantly impaired due to light irradiation.

Meanwhile, for enhancing the wet heat resistance, it has been proposed to use an electrically conductive polymer in which a hydroxy group-containing aromatic compound having two or more hydroxyl groups bonded to the aromatic ring is mixed (JP-A-2006-131873).

SUMMARY OF THE INVENTION

In the technique of JP-A-2006-131873, however, it has been found that when an electrically conductive polymer is used in combination with a general hardcoat material which is cured by radical polymerization, the above-described hydroxyl group-containing aromatic compound sometimes functions as a radical trapping agent to inhibit the polymerization and allow for no proceeding of curing of the coating film.

In particular, a coating film having a low density of the electrically conductive polymer as a result of mixing of a curable binder and an electrically conductive polymer suffers from significant deterioration of the light resistance and can hardly satisfy not only the electrical conductivity but also the hardness and transmittance of the coating film. More specifically, it has been found that a small content of the electrically conductive polymer gives rise to bad durability and when the content is increased, this incurs a problem of reduction in the hardness of the coating film or reduction in the transmittance due to coloring. In this respect, improvements are required.

The present invention has been made under these circumstances, and an object of the present invention is to provide an optical film having an antistatic layer assured of high coat strength, excellent in the hardcoat performance, transparency and antistatic property and at the same time, excellent in the heat resistance, wet heat resistance and light resistance.

As a result of intensive studies to solve the problems above, the present inventors have discovered that when a compound (C) of the present invention described blow is used in combination in the mixture of an electrically conductive polymer and a curable monomer, those problems can be solved and the above-described object can be attained. The present invention has been accomplished based on this discovery.

[1] An optical film comprising a transparent support and at least one antistatic layer formed from a composition containing at least the following (A) to (D):

(A) an electrically conductive polymer,
(B) a polyfunctional monomer having two or more polymerizable groups,
(C) at least one kind of a compound selected from the following compound (1), the following compound (2) and the following compound (3), and
(D) a photopolymerization initiator:

Compound (1):
a compound represented by the following formula (1):

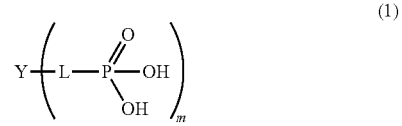

[wherein Y represents an m-valent group selected from a hydrogen atom, a carbon atom, a heteroatom, a hydroxy group, a mercapto group, a substituted or unsubstituted group derived from an amino group, a substituted or unsubstituted group derived from an alkyl group, a substituted or unsubstituted group derived from an acyl group, a substituted or unsubstituted group derived from an aryl group, a substituted or unsubstituted group derived from an alkoxy group, a substituted or unsubstituted group derived from an aryloxy group and a substituted or unsubstituted group derived from a heteroaryl group, L represents a single bond, a substituted or unsubstituted divalent hydrocarbon group, a substituted or unsubstituted divalent heteroatom, or a substituted or unsubstituted imino group, and m represents an integer of 1 or more];

Compound (2):
a compound represented by the following formula (2):

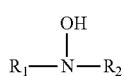

(2)

[wherein $R_1$ represents a hydrogen atom, an alkyl group, an acyl group, an aryl group, an alkoxy group, an aryloxy group or a heteroaryl group, $R_2$ represents a hydrogen atom, an alkyl group, an aryl group, a heteroaryl group or a sulfonyl group, and the alkyl group, acyl group, aryl group, alkoxy group, aryloxy group, heteroaryl group and sulfonyl group each may have a substituent]; and Compound (3):
a trivalent phosphorus compound.

[2] The optical film as described in [1] above, wherein the common logarithmic value (Log SR) of the surface resistivity SR (Ω/sq) of the optical film is from 6 to 12.

[3] The optical film as described in [1] or [2] above, wherein the electrically conductive polymer (A) contains at least any one of polythiophene, polyaniline, polypyrrole and derivatives thereof.

[4] The optical film as described in [1] or [2] above, wherein the electrically conductive polymer (A) contains at least any one of polythiophene and derivatives thereof.

[5] The optical film as described in [1] or [2] above, wherein the electrically conductive polymer (A) contains poly(3,4-ethylenedioxy)thiophene.

[6] The optical film as described in any one of [1] to [5] above, wherein a polystyrenesulfonic acid is contained as a dopant of the electrically conductive polymer (A).

[7] The optical film as described in any one of [1] to [6] above, wherein the compound (1) is a phosphonic acid compound.

[8] The optical film as described in any one of [1] to [7] above, wherein in formula (1), m is an integer of 2 or more.

[9] The optical film as described in any one of [1] to [8] above, wherein the compound represented by formula (2) contains at least one compound selected from the group consisting of a hydroxamic acid compound and a hydroxyamine compound.

[10] The optical film as described in any one of [1] to [9] above, wherein the trivalent phosphorus compound of the compound (3) is a compound represented by the following formula (I), (II), (III) or (IV):

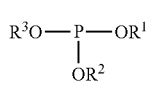

(I)

(II)

(III)

(IV)

[wherein each of $R^1$, $R^2$, $R^3$, $R^4$, $R^5$, $R^6$, $R^7$, $R^8$, $R^9$, $R^{10}$, $R^{11}$ and $R^{12}$ independently represents a hydrogen atom, a substituted or unsubstituted alkyl group, a substituted or unsubstituted aryl group, or a substituted or unsubstituted heteroaryl group].

[11] The optical film as described in any one of [1] to [10] above, wherein the polymerizable group of the (B) polyfunctional monomer having two or more polymerizable groups is any one group selected from a substituted or unsubstituted acryloyl group, a substituted or unsubstituted methacryloyl group, and —C(O)OCH=CH$_2$.

[12] The optical film as described in any one of [1] to [11] above, wherein the composition further contains (F) a fluorine-containing or silicon-containing surfactant.

[13] The optical film as described in any one of [1] to [12] above, wherein the compound (1) and the compound (2) are contained as the component (C).

[14] The optical film as described in any one of [1] to [13] above, wherein the compound (1) and the compound (3) are contained as the component (C).

[15] The optical film as described in any one of [1] to [14] above, wherein the antistatic layer contains a translucent particle having an average particle diameter of 0.5 to 20 μm (on the volume basis).

[16] An antireflection film having a low refractive index layer on the antistatic layer of the optical film described in any one of [1] to [15] above, directly or through another layer.

[17] A polarizing plate using the optical film described in any one of [1] to [15] above or the antireflection film described in [16] above, as a polarizing plate protective film.

[18] An image display device having the optical film described in any one of [1] to [15] above, the antireflection film described in [16] above, or the polarizing plate described in [17] above, on the outermost surface of the display.

According to the present invention, an optical film and an antireflection film, each having an antistatic layer assured of high coat strength, excellent in the hardcoat performance, transparency and antistatic property and at the same time, excellent in the heat resistance, wet heat resistance and light resistance, and a polarizing plate and an image display device, each using the film, can be provided.

DETAILED DESCRIPTION OF THE INVENTION

The present invention is described in detail below.
The optical film of the present invention has, on a transparent support, at least one antistatic layer formed of a composition containing at least the following (A) to (D). More specifically, the optical film can be formed by applying a coating composition containing the following components (A) to (D) on a transparent support and curing the coating:

(A) an electrically conductive polymer,
(B) a polyfunctional monomer having two or more polymerizable groups,
(C) at least one kind of a compound selected from the following compound (1), the following compound (2) and the following compound (3), and
(D) a photopolymerization initiator:
Compound (1):
a compound represented by the following formula (1):

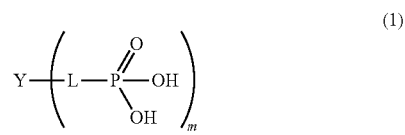

[wherein Y represents an m-valent group selected from a hydrogen atom, a carbon atom, a heteroatom, a hydroxy group, a mercapto group, a substituted or unsubstituted group derived from an amino group, a substituted or unsubstituted group derived from an alkyl group, a substituted or unsubstituted group derived from an acyl group, a substituted or unsubstituted group derived from an aryl group, a substituted or unsubstituted group derived from an alkoxy group, a substituted or unsubstituted group derived from an aryloxy group and a substituted or unsubstituted group derived from a heteroaryl group, L represents a single bond, a substituted or unsubstituted divalent hydrocarbon group, a substituted or unsubstituted divalent heteroatom, or a substituted or unsubstituted imino group, and m represents an integer of 1 or more];
Compound (2):
a compound represented by the following formula (2):

[wherein $R_1$ represents a hydrogen atom, an alkyl group, an acyl group, an aryl group, an alkoxy group, an aryloxy group or a heteroaryl group, $R_2$ represents a hydrogen atom, an alkyl group, an aryl group, a heteroaryl group or a sulfonyl group, and the alkyl group, acyl group, aryl group, alkoxy group, aryloxy group, heteroaryl group and sulfonyl group each may have a substituent]; and
Compound (3):
a trivalent phosphorus compound.
Each component contained in the antistatic layer according to the present invention is described below.
[(A) Electrically Conductive Polymer]
The electrically conductive polymer which can be used for the optical film of the present invention is first described.
The electrically conductive polymer for use in the present invention indicates a polymer showing electrical conductivity of $10^{-6}$ S·cm$^{-1}$ or more, and any compound may be used as long as it is a polymer compound falling under this class. A polymer compound having an electrical conductivity of $10^{-1}$ S·cm$^{-1}$ or more is preferred.
The electrically conductive polymer is preferably a non-conjugated polymer or conjugated polymer in which aromatic carbocyclic rings or aromatic heterocyclic rings are linked by a single bond or a divalent or higher-valent linking group. Examples of the aromatic carbocyclic ring in the non-conjugated polymer or conjugated polymer include a benzene ring, and the ring may further form a fused ring. Examples of the aromatic heterocyclic ring in the non-conjugated polymer or conjugated polymer include a pyridine ring, a pyrazine ring, a pyrimidine ring, a pyridazine ring, a triazine ring, an oxazole ring, a thiazole ring, an imidazole ring, an oxadiazole ring, a thiadiazole ring, a triazole ring, a tetrazole ring, a furan ring, a thiophene ring, a pyrrole ring, an indole ring, a carbazole ring, a benzimidazole ring and an imidazopyridine ring, and the ring may further form a fused ring.

The divalent or higher-valent linking group in the non-conjugated polymer or conjugated polymer includes a linking group formed, for example, by a carbon atom, a silicon atom, a nitrogen atom, a boron atom, an oxygen atom, a sulfur atom, a metal or a metal ion. The linking group is preferably a group formed by a carbon atom, a nitrogen atom, a silicon atom, a boron atom, an oxygen atom, a sulfur atom or a combination thereof. Examples of the group formed by a combination include a substituted or unsubstituted methylene group, a substituted or unsubstituted carbonyl group, a substituted or unsubstituted imino group, a substituted or unsubstituted sulfonyl group, a substituted or unsubstituted sulfinyl group, a substituted or unsubstituted ester group, a substituted or unsubstituted amide group, and a substituted or unsubstituted silyl group.

Specific examples of the electrically conductive polymer include substituted or unsubstituted electrically conductive polyaniline, polyparaphenylene, polyparaphenylene vinylene, polythiophene, polyfuran, polypyrrole, polyselenophene, polyisothianaphthene, polyphenylene sulfide, polyacetylene, polypyridyl vinylene, polyazine, and derivatives thereof. One of these polymers may be used alone, or two or more thereof can be used in combination according to the purpose.

Also, as long as the desired electrical conductivity can be obtained, the polymer can be used as a mixture with any other polymer having no electrical conductivity, or a copolymer of a monomer capable of configuring an electrically conductive polymer and any other monomer having no electrical conductivity may be used.

The electrically conductive polymer is preferably a conjugated polymer. Examples of the conjugated polymer include polyacetylene, polydiacetylene, poly(paraphenylene), polyfluorene, polyazulene, poly(paraphenylene sulfide), polypyrrole, polythiophene, polyisothianaphthene, polyaniline, poly(paraphenylene vinylene), poly(2,5-thienylene vinylene), a double chain-type conjugated polymer (e.g., polyperinaphthalene), a metallophthalocyanine-based polymer, other conjugated polymers (e.g., poly(paraxylylene), poly[α-(5,5'-bithiophenediyl)benzylidene]), and derivatives thereof.

Among these, poly(paraphenylene), polypyrrole, polythiophene, polyaniline, poly(paraphenylene vinylene) and poly(2,5-thienylene vinylene) are preferred, polythiophene, polyaniline, polypyrrole and derivatives thereof are more preferred, and at least any one of polythiophene and derivatives thereof is still more preferred.

These conjugated polymers each may have a substituent, and the substituent of these conjugated polymers includes the substituent described as $R^{11}$ in formula (X) later.

In particular, from the standpoint of obtaining an optical film satisfying both high transparency and antistatic property, it is preferred that the electrically conductive polymer has a partial structure represented by the following formula (X) (that is, the polymer is polythiophene or a derivative thereof).

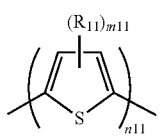
Formula (X)

In formula (X), $R^{11}$ represents a substituent; m11 represents an integer of 0 to 2, and when m11 represents 2, the plurality of $R^{11}$'s may be the same or different and may combine with each other to form a ring; and $n^{11}$ represents an integer of 1 or more.

Examples of the substituent represented by $R^{11}$ include an alkyl group (preferably having a carbon number of 1 to 20, more preferably a carbon number of 1 to 12, still more preferably a carbon number of 1 to 8; e.g., methyl, ethyl, isopropyl, tert-butyl, n-octyl, n-decyl, n-hexadecyl, cyclopropyl, cyclopentyl, cyclohexyl), an alkenyl group (preferably having a carbon number of 2 to 20, more preferably a carbon number of 2 to 12, still more preferably a carbon number of 2 to 8; e.g., vinyl, allyl, 2-butenyl, 3-pentenyl, 2-hexenyl, 3-hexenyl, 4-hexenyl, 2-octenyl), an alkynyl group (preferably having a carbon number of 2 to 20, more preferably a carbon number of 2 to 12, still more preferably a carbon number of 2 to 8; e.g., propargyl, 3-pentynyl), an aryl group (preferably having a carbon number of 6 to 30, more preferably a carbon number of 6 to 20, still more preferably a carbon number of 6 to 12; e.g., phenyl, p-methylphenyl, naphthyl), an amino group (preferably having a carbon number of 0 to 20, more preferably a carbon number of 0 to 10, still more preferably a carbon number of 0 to 6; e.g., amino, methylamino, dimethylamino, diethylamino, dibenzylamino, diphenylamino), an alkoxy group (preferably having a carbon number of 1 to 20, more preferably a carbon number of 1 to 12, still more preferably a carbon number of 1 to 8; e.g., methoxy, ethoxy, butoxy, hexyloxy, octyloxy), an aryloxy group (preferably having a carbon number of 6 to 20, more preferably a carbon number of 6 to 16, still more preferably a carbon number of 6 to 12; e.g., phenyloxy, 2-naphthyloxy), an acyl group (preferably having a carbon number of 1 to 20, more preferably a carbon number of 1 to 16, still more preferably a carbon number of 1 to 12; e.g., acetyl, benzoyl, formyl, pivaloyl), an alkoxycarbonyl group (preferably having a carbon number of 2 to 20, more preferably a carbon number of 2 to 16, still more preferably a carbon number of 2 to 12; e.g., methoxycarbonyl, ethoxycarbonyl), an aryloxycarbonyl group (preferably having a carbon number of 7 to 20, more preferably a carbon number of 7 to 16, still more preferably a carbon number of 7 to 10; e.g., phenyloxycarbonyl), an acyloxy group (preferably having a carbon number of 2 to 20, more preferably a carbon number of 2 to 16, still more preferably a carbon number of 2 to 10; e.g., acetoxy, benzoyloxy), an acylamino group (preferably having a carbon number of 2 to 20, more preferably a carbon number of 2 to 16, still more preferably a carbon number of 2 to 10; e.g., acetylamino, benzoylamino), an alkoxycarbonylamino group (preferably having a carbon number of 2 to 20, more preferably a carbon number of 2 to 16, still more preferably a carbon number of 2 to 12; e.g., methoxycarbonylamino), an aryloxycarbonylamino group (preferably having a carbon number of 7 to 20, more preferably a carbon number of 7 to 16, still more preferably a carbon number of 7 to 12; e.g., phenyloxycarbonylamino), a sulfonylamino group (preferably having a carbon number of 1 to 20, more preferably a carbon number of 1 to 16, still more preferably a carbon number of 1 to 12; e.g., methanesulfonylamino, benzenesulfonylamino), a sulfamoyl group (preferably having a carbon number of 0 to 20, more preferably a carbon number of 0 to 16, still more preferably a carbon number of 0 to 12; e.g., sulfamoyl, methylsulfamoyl, dimethylsulfamoyl, phenylsulfamoyl), a carbamoyl group (preferably having a carbon number of 1 to 20, more preferably a carbon number of 1 to 16, still more preferably a carbon number of 1 to 12; e.g., carbamoyl, methylcarbamoyl, diethylcarbamoyl, phenylcarbamoyl), an alkylthio group (preferably having a carbon number of 1 to 20, more preferably a carbon number of 1 to 16, still more preferably a carbon number of 1 to 12; e.g., methylthio, ethylthio), an arylthio group (preferably having a carbon number of 6 to 20, more preferably a carbon number of 6 to 16, still more preferably a carbon number of 6 to 12; e.g., phenylthio), a sulfonyl group (preferably having a carbon number of 1 to 20, more preferably a carbon number of 1 to 16, still more preferably a carbon number of 1 to 12; e.g., mesyl, tosyl), a sulfinyl group (preferably having a carbon number of 1 to 20, more preferably a carbon number of 1 to 16, still more preferably a carbon number of 1 to 12; e.g., methanesulfinyl, benzenesulfinyl), a ureido group (preferably having a carbon number of 1 to 20, more preferably a carbon number of 1 to 16, still more preferably a carbon number of 1 to 12; e.g., ureido, methylureido, phenylureido), a phosphoric acid amide group (preferably having a carbon number of 1 to 20, more preferably a carbon number of 1 to 16, still more preferably a carbon number of 1 to 12; e.g., diethylphosphoric acid amide, phenylphosphoric acid amide), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having a carbon number of 1 to 20, more preferably a carbon number of 1 to 12; examples of the heteroatom include a nitrogen atom, an oxygen atom and a sulfur atom; specifically, for example, pyrrolidine, piperidine, piperazine, morpholine, thiophene, furan, pyrrole, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene), and a silyl group (preferably having a carbon number of 3 to 40, more preferably a carbon number of 3 to 30, still more preferably a carbon number of 3 to 24; e.g., trimethylsilyl, triphenylsilyl).

The substituent represented by $R^{11}$ may be further substituted. Also, when the substituent has a plurality of substituents, these substituents may be the same or different and, if possible, may combine with each other to form a ring. Examples of the ring formed include a cycloalkyl ring, a benzene ring, a thiophene ring, a dioxane ring and a dithiane ring.

The substituent represented by $R^{11}$ is preferably an alkyl group, an alkenyl group, an alkynyl group, an alkoxy group or an alkylthio group, more preferably an alkyl group, an alkoxy group or an alkylthio group. In particular, it is preferred that m11 is 2 and two $R^{11}$'s are alkoxy groups or alkylthio groups and form a ring, more preferably a dioxane ring or a dithiane ring.

In formula (X), when m11 is 1, $R^{11}$ is preferably an alkyl group, more preferably an alkyl group having a carbon number of 2 to 8.

Also, when $R^{11}$ is a poly(3-alkylthiophene) that is an alkyl group, the linkage mode between adjacent thiophene rings includes a sterically regular mode in which all rings are linked by a 2-5' linkage, and a sterically irregular mode containing a 2-2' linkage and a 5-5' linkage. A sterically irregular mode is preferred.

In the present invention, from the standpoint of satisfying both high transparency and high electrical conductivity, the electrically conductive polymer is more preferably poly(3, 4-ethylenedioxy)thiophene (PEDOT, Compound (6) in specific examples shown below).

The polythiophene represented by formula (X) and derivatives thereof can be produced by a known method described, for example, in *J. Mater. Chem.*, 15, 2077-2088 (2005) and *Advanced Materials*, 12(7), page 481 (2000). Also, these are available as a commercial product such as Denatron P502 (produced by Nagase ChemteX Corporation); and 3,4-ethylenedioxythiophene (BAYTRON (registered trademark) M V2) 3,4-polyethylenedioxythiopene/polystyrenesulfonate (BAYTRON (registered trademark) P), BAYTRON (registered trademark) C, BAYTRON (registered trademark) F E, BAYTRON (registered trademark) M V2, BAYTRON (registered trademark) P, BAYTRON (registered trademark) P AG, BAYTRON (registered trademark) P HC V4, BAYTRON (registered trademark) P HS, BAYTRON (registered trademark) PH, BAYTRON (registered trademark) PH 500, and BAYTRON (registered trademark) PH 510 (all produced by H.C. Starck GmbH).

As to the polyaniline and derivatives thereof, for example, Polyaniline (produced by Aldrich Chemical Company, Inc.) and Polyaniline (emeraldine salt) (produced by Aldrich Chemical Company, Inc.) are available.

Specific examples of the electrically conductive polymer are illustrated below, but the present invention is not limited thereto. Other examples include the compounds described in International Publication No. WO98/01909.

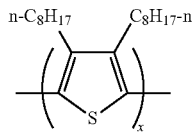

(5)

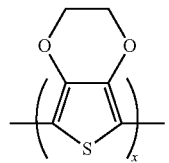

(6)

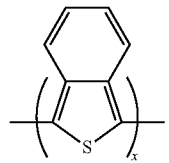

(7)

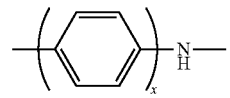

(8)

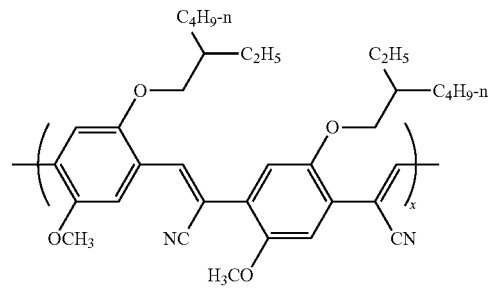

(9)

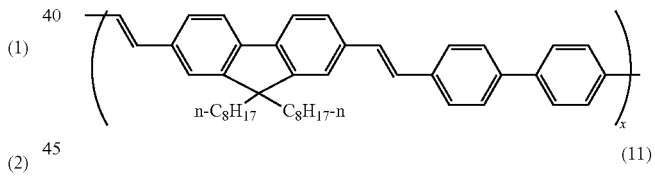

(10)

(1)

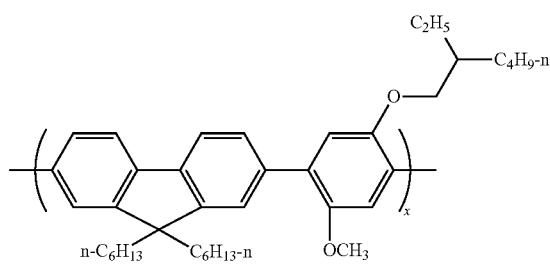

(11)

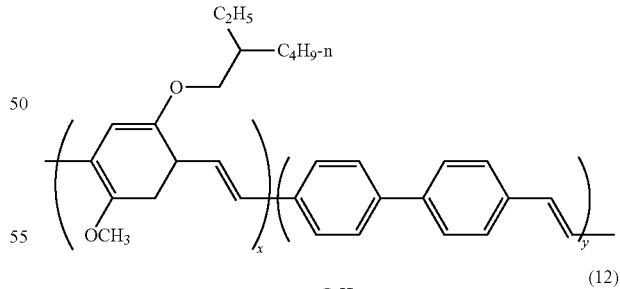

(2)

(12)

(3)

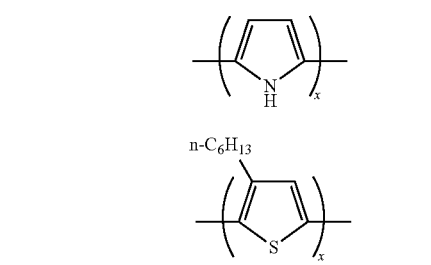

(4)

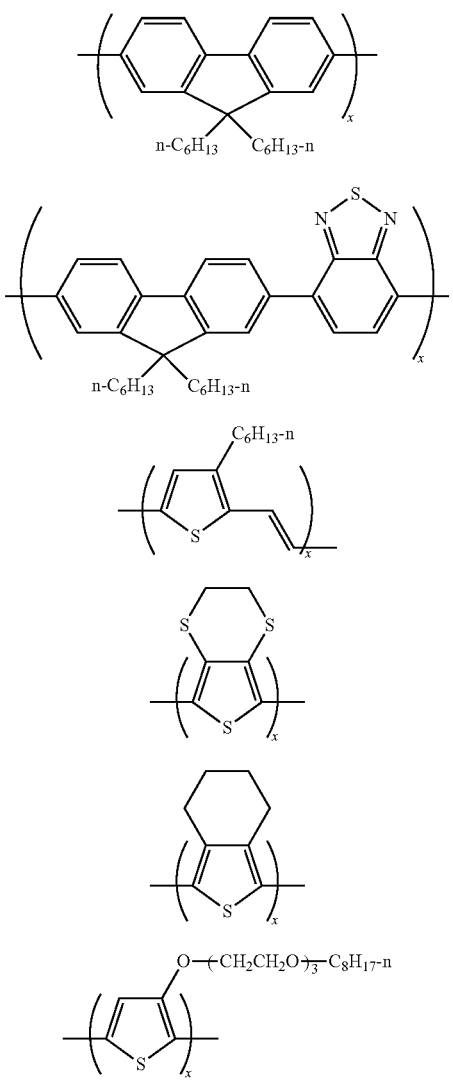

The weight average molecular weight of the electrically conductive polymer for use in the present invention is preferably from 1,000 to 1,000,000, more preferably from 10,000 to 500,000, still more preferably from 10,000 to 100,000. The weight average molecular weight as used herein is a polystyrene-equivalent weight average molecular weight measured by gel permeation chromatography.

(Solubility in Organic Solvent)

In view of coatability and imparting affinity for the component (B), the electrically conductive polymer is preferably soluble in an organic solvent. More specifically, the electrically conductive polymer for use in the present invention is preferably soluble in an amount of at least 1.0 mass % in an organic solvent having a water content of 5 mass % and a relative permittivity of 2 to 30.

The term "soluble" as used herein indicates that the polymer is dissolved in a single molecular state or in a state of a plurality of single molecules being associated or is dispersed as particles having a particle diameter of 300 nm or less.

In general, the electrically conductive polymer has high hydrophilicity and is conventionally dissolved in a solvent mainly composed of water. In order to solubilize such an electrically conductive polymer in an organic solvent, a method of adding a compound capable of increasing the affinity for an organic solvent (for example, the later-described solubilization aid) to a composition containing the electrically conductive polymer, or a method of adding a dispersant or the like to the organic solvent may be employed. Also, in the case of using an electrically conductive polymer and a polyanion dopant, as described later, a hydrophobing treatment of the polyanion dopant is preferably performed.

Furthermore, there may be used a method where an electrically conductive polymer in a dedoped state (in a state of not using a dopant) is enhanced in the organic solvent solubility and a dopant is added after the formation of a coated film to develop the electrical conductivity.

In addition, the methods described in the following literatures are also preferably used as the method for enhancing the solubility in an organic solvent.

For example, JP-A-2002-179911 describes a method where a polyaniline composition in a dedoped state is dissolved in an organic solvent, the resulting material is coated on a substrate and dried, and the coating is subjected to an oxidation and doping treatment to develop the electrical conductivity.

Also, International Publication No. 05/035626 describes a method for producing an electrically conductive polyaniline, where at the time of oxidatively polymerizing aniline or a derivative thereof in a mixed layer composed of an aqueous layer and an organic layer in the presence of at least one of a sulfonic acid and a water-insoluble organic polymer compound having a protonic acid group, a molecular weight modifier and, if desired, a phase-transfer catalyst are caused to be present together and thereby, the polymer is stably dispersed in an organic solvent.

For example, alcohols, aromatic hydrocarbons, ethers, ketones and esters are suitable as the organic solvent. Specific examples of these compounds are described below (the relative permittivity is shown in the parenthesis).

The alcohols include, for example, a monohydric alcohol and a dihydric alcohol. Of these, the monohydric alcohol is preferably a saturated aliphatic alcohol having a carbon number of 2 to 8. Specific examples of the alcohols include ethyl alcohol (25.7), n-propyl alcohol (21.8), i-propyl alcohol (18.6), n-butyl alcohol (17.1), sec-butyl alcohol (15.5) and tert-butyl alcohol (11.4).

Specific examples of the aromatic hydrocarbons include benzene (2.3), toluene (2.2) and xylene (2.2); specific examples of the ethers include tetrahydrofuran (7.5), ethylene glycol monomethyl ether (16), ethylene glycol monomethyl ether acetate (8), ethylene glycol monoethyl ether (14), ethylene glycol monoethyl ether acetate (8) and ethylene glycol monobutyl ether (9); specific examples of the ketones include acetone (21.5), diethyl ketone (17.0), methyl ethyl ketone (15.5), diacetone alcohol (18.2), methyl isobutyl ketone (13.1) and cyclohexanone (18.3); and specific examples of the esters include methyl acetate (7.0), ethyl acetate (6.0), propyl acetate (5.7) and butyl acetate (5.0).

From the standpoint that both the electrically conductive polymer and the (B) polyfunctional monomer having two or more polymerizable groups can be dissolved and dispersed, the relative permittivity of the organic solvent is preferably 2.3 to 24, more preferably from 4.0 to 21, and most preferably from 5.0 to 21. For example, i-propyl alcohol, acetone, propylene glycol monoethyl ether, cyclohexanone and methyl acetate are preferred, and i-propyl alcohol, acetone and propylene glycol monoethyl ether are more preferred.

In the present invention, the relative permittivity indicates a value measured at 20° C.

A mixture of two or more kinds of organic solvents having a relative permittivity of 2 to 30 may also be used. An organic solvent having a relative permittivity exceeding 30, or water in an amount of 5 mass % or less may be used in combination, but it is preferred that in the mixed organic solvent system containing the organic solvent described above, the mass average relative permittivity of a plurality of organic solvents or water does not exceed 30. Within this range, a coating composition where both the electrically conductive polymer and the (B) polyfunctional monomer having two or more polymerizable groups are dissolved or dispersed can be formed, and a laminate having a good surface profile of the coating film can be obtained.

The water content of the organic solvent is preferably from 0 to 5 mass %, more preferably from 0 to 1 mass %.

The electrically conductive polymer is preferably soluble in an organic solvent at a concentration of at least 1.0 mass %, more preferably at a concentration of at least from 1.0 to 10.0 mass %, still more preferably at a concentration of at least from 3.0 to 30.0 mass %.

In the organic solvent, the electrically conductive polymer may be present as particles. In this case, the average particle size is preferably 300 nm or less, more preferably 200 nm or less, still more preferably 100 nm or less. With the particle size in this range, precipitation of particles in the organic solvent can be suppressed. The lower limit of the particle size is not particularly limited.

A high-pressure disperser may also be used so as to remove coarse particles or accelerate the dissolution. Examples of the high-pressure disperser include Gaulin (manufactured by A.P.V Gaulin Inc.), Nanomizer (manufactured by Nanomizer Inc.), Microfluidizer (manufactured by Microfluidex Inc.), Altimizer (produced by Sugino Machine) and DeBee (manufactured by Bee International Ltd.). The particle size can be observed after scooping an organic solvent solution on a grid for electron microscopic observation and volatilizing the solvent.

(Hydrophobing Treatment)

As described above, in the case of using a polyanion dopant together with the electrically conductive polymer, the composition containing the electrically conductive polymer and the polyanion dopant is preferably subjected to a hydrophobing treatment. By applying a hydrophobing treatment to the composition above, solubility of the electrically conductive polymer in an organic solvent can be increased, and the affinity for the (B) polyfunctional monomer having two or more polymerizable groups can be enhanced. The hydrophobing treatment can be performed by modifying the anion group of the polyanion dopant.

More specifically, a first method for the hydrophobing treatment includes a method of esterifying, etherifying, acetylating, tosylating, tritylating, alkylsilylating or alkylcarbonylating the anion group. Above all, esterification and etherification are preferred. Examples of the method of performing hydrophobization by esterification include a method of chlorinating the anion group of the polyanion dopant with a chlorinating agent and then esterifying it with an alcohol such as methanol and ethanol. The hydrophobization can also be performed by esterifying the anion group with a sulfo group or a carboxy group by using a compound having a hydroxyl group or a glycidyl group and further using a compound having an unsaturated double bonding group.

In the present invention, conventionally known various methods can be used, and these methods are specifically described, for example, in JP-A-2005-314671 and JP-2006-28439.

A second method for the hydrophobing treatment includes a method of hydrophobing the anion group of the polyanion dopant by bonding a basic compound thereto. The basic compound is preferably an amine-based compound, and examples thereof include a primary amine, a secondary amine, a tertiary amine and an aromatic amine. specific examples thereof include a primary to tertiary amine substituted with an alkyl group having a carbon number of 1 to 20, an imidazole or pyridine substituted with an alkyl group having a carbon number of 1 to 20. for enhancing the solubility in an organic solvent, the molecular weight of the amine is preferably from 50 to 2,000, more preferably from 70 to 1,000, and most preferably from 80 to 500.

The amount of the amine compound that is a basic hydrophobing agent is preferably from 0.1 to 10.0 molar equivalents, more preferably from 0.5 to 2.0 molar equivalents, still more preferably from 0.85 to 1.25 molar equivalents, based on the anion group of the polyanion dopant not contributing to doping of the electrically conductive polymer. Within this range, the solubility in an organic solvent, the electrical conductivity and the strength of the coating film can be satisfied.

As for other details of the hydrophobing treatment, the matters described, for example, in JP-A-2008-115215 and JP-A-2008-115216 can be applied.

(Solubilization Aid)

The electrically conductive polymer can be used together with a compound containing a hydrophilic moiety, a hydrophobic moiety and, preferably, an ionizing radiation-curable functional group-containing moiety in the molecule (hereinafter referred to as a "solubilization aid").

Use of a solubilization aid assists in solubilizing the electrically conductive polymer in an organic solvent having a low water content and furthermore, makes it possible to improve the coated surface state of a layer formed of the composition of the present invention or increase the strength of the cured film.

The solubilization aid is preferably a copolymer having a hydrophilic moiety, a hydrophobic moiety and an ionizing radiation-curable functional group-containing moiety, more preferably a block or graft copolymer in which these moieties divided into segments. Such a copolymer can be polymerized by living anionic polymerization or living radical polymerization or by using macromonomers having the moieties above.

The solubilization aid is described, for example, in JP-A-2006-176681, paragraphs [0022] to [0038].

(Preparation Method of Solution Containing Electrically Conductive Polymer)

The electrically conductive polymer can be prepared in the form of a solution by using the organic solvent described above.

The method for preparing an electrically conductive polymer solution includes several methods, but the following three methods are preferred. The first method is a method of polymerizing an electrically conductive polymer in water in the co-presence of a polyanion dopant, treating the polymer, if desired, by adding the above-described solubilization aid or basic hydrophobing agent, and then replacing the water with an organic solvent. The second method is a method of polymerizing an electrically conductive polymer in water in the co-presence of a polyanion dopant, treating the polymer, if desired, with the above-described solubilization aid or basic hydrophobing agent, evaporating the water to dryness, and adding an organic solvent to solubilize the polymer. The third method is a method of separately preparing a π-conjugated electrically conductive polymer and a polyanion dopant, mixing and dispersing these two members in a solvent to prepare an electrically conductive polymer composition in a doped state, and when the solvent contains water, replacing the water with an organic solvent.

In the methods above, the amount of the solubilization aid used is preferably from 1 to 100 mass %, more preferably from 2 to 70 mass %, and most preferably from 5 to 50 mass %, based on the total amount of the electrically conductive polymer and the polyanion dopant. In the first method, the method for replacing water with an organic solvent is preferably a method of preparing a uniform solution by adding and using a solvent having high water miscibility, such as ethanol, isopropyl alcohol and acetone, and then removing the water by ultrafiltration. Also, a method of reducing the water content to a certain extent by using a solvent having high water miscibility, mixing a more hydrophobic solvent, and removing highly volatile components under reduced pressure to prepare a solvent composition may be used. Furthermore, when sufficient hydrophobization is performed using a basic hydrophobing agent, it is also possible to separate the composition into a two-phase system by adding an organic solvent having low water miscibility and extract the organic electrically conductive polymer into the organic solvent phase from the aqueous phase.

[(B) Polyfunctional Monomer Having Two or More Polymerizable Unsaturated Groups]

In the present invention, the composition contains (B) a polyfunctional monomer having two or more polymerizable unsaturated groups. The (B) polyfunctional monomer having two or more polymerizable unsaturated groups can function as a curing agent. Thanks to a combination use of (A) an electrically conductive polymer and (B) a polyfunctional monomer having two or more polymerizable unsaturated groups, both the electrical conductivity and the strength or scratch resistance of the coating film can be satisfied. The number of polymerizable unsaturated groups is preferably 3 or more.

The polyfunctional monomer having two or more polymerizable unsaturated groups, which is used in the present invention, is described below. The monomer includes compounds having a polymerizable functional group such as (meth)acryloyl group, vinyl group, styryl group, allyl group and —C(O)OCH=CH$_2$. Above all, any group selected from a substituted or unsubstituted acryloyl group, a substituted or unsubstituted methacryloyl group, and —C(O)OCH=CH$_2$ is preferred. A compound containing three or more (meth)acryloyl groups within one molecule can be more preferably used.

Specific examples of the compound having a polymerizable unsaturated bond include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adduct, epoxy (meth)acrylates, urethane (meth)acrylates, and polyester (meth)acrylates.

Among these, esters of polyhydric alcohol and (meth)acrylic acid are preferred. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl)isocyanurate.

As for the polyfunctional acrylate-based compounds having a (meth)acryloyl group, commercially available products may also be used, and examples thereof include KAYARAD DPHA and KAYARAD PET-30, produced by Nippon Kayaku Co., Ltd.

The non-fluorine-containing polyfunctional monomer is described in JP-A-2009-98658, paragraphs [0114] to [0122], and the same applies to the present invention.

[(C) Compound (1), Compound (2) and Compound (3)]

The composition of an antistatic layer of the present invention contains at least any one of the compound (1), the compound (2) and the compound (3). By virtue of adding at least any one of the compound (1), the compound (2) and the compound (3) to the composition for an antistatic layer, an antistatic optical film excellent in the heat resistance, wet heat resistance and light resistance can be obtained.

<Compound (1)>

The compound (1) is a compound represented by the following formula (1). The reason why an optical film excellent in the light resistance and wet heat durability is obtained by containing a compound represented by the following formula (1) in the antistatic layer is not clearly known, but the compound (1) is considered to suppress dedoping of the electrically conductive polymer and in turn, prevent the decomposition reaction associated therewith.

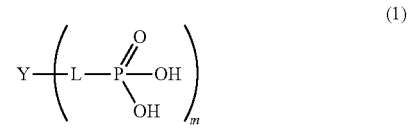

In formula (1), Y represents an m-valent group selected from a hydrogen atom, a carbon atom, a heteroatom, a hydroxy group, a mercapto group, an amino group-derived group, an alkyl group-derived group, an acyl group-derived group, an aryl group-derived group, an alkoxy group-derived group, an aryloxy group-derived group and a heteroaryl group-derived group, L represents a single bond, a divalent hydrocarbon group, a divalent heteroatom or an imino group, and m represents an integer of 1 or more.

In formula (1), Y each may have a substituent. The substituent includes the following substituent group V:

(Substituent Group V)

a halogen atom (e.g., chlorine, bromine, iodine, fluorine); a mercapto group; a cyano group; a carboxyl group; a phosphoric acid group; a sulfo group; a hydroxy group; a carbamoyl group having a carbon number of 1 to 10, preferably a carbon number of 2 to 8, more preferably a carbon number of 2 to 5 (e.g., methylcarbamoyl, ethylcarbamoyl, morpholinocarbamoyl); a sulfamoyl group having a carbon number of 0 to 10, preferably a carbon number of 2 to 8, more preferably a carbon number of 2 to 5 (e.g., methylsulfamoyl, ethylsulfamoyl, piperidinosulfamoyl); a nitro group; an alkoxy group having a carbon number of 1 to 20, preferably a carbon number of 1 to 10, more preferably a carbon number of 1 to 8 (e.g., methoxy, ethoxy, 2-methoxyethoxy 2-phenylethoxy); an aryloxy groups having a carbon number of 6 to 20, preferably a carbon number of 6 to 12, more preferably a carbon number of 6 to 10 (e.g., phenoxy, p-methylphenoxy, p-chlorophenoxy, naphthoxy); an acyl groups having a carbon number of 1 to 20, preferably a carbon number of 2 to 12, more preferably a carbon number of 2 to 8 (e.g., acetyl, benzoyl, trichloroacetyl); an acyloxy groups having a carbon number of 1 to 20, preferably a carbon number of 2 to 12, more preferably a carbon number of 2 to 8 (e.g., acetyloxy, benzoyloxy); an acylamino group having a carbon number of 1 to 20, preferably a carbon number of 2 to 12, more preferably a carbon number of 2 to 8 (e.g., acetylamino);

a sulfonyl group having a carbon number of 1 to 20, preferably a carbon number of 1 to 10, more preferably a carbon number of 1 to 8 (e.g., methanesulfonyl, ethanesulfonyl, benzenesulfonyl); a sulfinyl group having a carbon number of 1 to 20, preferably a carbon number of 1 to 10, more preferably a carbon number of 1 to 8 (e.g., methanesulfinyl, ethanesulfinyl, benzenesulfinyl); a sulfonylamino group having a carbon number of 1 to 20, preferably a carbon number of 1 to 10, more preferably a carbon number of 1 to 8 (e.g., methanesulfonylamino, ethanesulfonylamino, benzenesulfonylamino); a substituted or unsubstituted amino group having a carbon number of 0 to 20, preferably a carbon number of 0 to 12, more preferably a carbon number of 0 to 8 (e.g., unsubstituted amino, methylamino, dimethylamino, benzylamino, anilino, diphenyl amino); an ammonium group having a carbon number of 0 to 15, preferably a carbon number of 3 to 10, more preferably a carbon number of 3 to 6 (e.g., trimethylammonium, triethylammonium); a hydrazino group having a carbon number of 0 to 15, preferably a carbon number of 1 to 10, more preferably a carbon number of 1 to 6 (e.g., trimethylhydrazino); a ureido group having a carbon number of 1 to 15, preferably a carbon number of 1 to 10, more preferably a carbon number of 1 to 6 (e.g., ureido, N,N-dimethylureido); an imido group having a carbon number of 1 to 15, preferably a carbon number of 1 to 10, more preferably a carbon number of 1 to 6 (e.g., succinimide);

an alkylthio group having a carbon number of 1 to 20, preferably a carbon number of 1 to 12, more preferably a carbon number of 1 to 8 (e.g., methylthio, ethylthio, propylthio); an arylthio group having a carbon number of 6 to 80, preferably a carbon number of 6 to 40, more preferably a carbon number of 6 to 30 (e.g., phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, 4-propylphenyl-2-ethynyl-4'-biphenylthio); a heteroarylthio group having a carbon number of 1 to 80, preferably a carbon number of 1 to 40, more preferably a carbon number of 1 to 30 (e.g., 2-pyridylthio, 3-pyridylthio, 4-pyridylthio, 2-quinolylthio, 2-furylthio, 2-pyrrolylthio); an alkoxycarbonyl group having a carbon number of 2 to 20, preferably a carbon number of 2 to 12, more preferably a carbon number of 2 to 8 (e.g., methoxycarbonyl, ethoxycarbonyl, 2-benzyloxycarbonyl); an aryloxycarbonyl group having a carbon number of 6 to 20, preferably a carbon number of 6 to 12, more preferably a carbon number of 6 to 10 (e.g., phenoxycarbonyl);

an unsubstituted alkyl group having a carbon number of 1 to 18, preferably a carbon number of 1 to 10, more preferably a carbon number of 1 to 5 (e.g., methyl, ethyl, propyl, butyl); a substituted alkyl group having a carbon number of 1 to 18, preferably a carbon number of 1 to 10, more preferably a carbon number of 1 to 5 {e.g., hydroxymethyl, trifluoromethyl, benzyl, carboxyethyl, ethoxycarbonylmethyl, acetylaminomethyl; here, the substituted alkyl group also includes an unsaturated hydrocarbon group having a carbon number of 2 to 18, preferably a carbon number of 3 to 10, more preferably a carbon number of 3 to 5 (e.g., vinyl, ethynyl, 1-cyclohexenyl, benzylidine, benzylidene)}; a substituted or unsubstituted aryl group having a carbon number of 6 to 20, preferably a carbon number of 6 to 15, more preferably a carbon number of 6 to 10 (e.g., phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyclohexyl-4'-biphenyl, 4-pentylcyclohexyl-4'-biphenyl, 4-propylphenyl-2-ethynyl-4'-biphenyl); and a substituted or unsubstituted heterocyclic group having a carbon number of 1 to 20, preferably a carbon number of 2 to 10, more preferably a carbon number of 4 to 6 (e.g., pyridyl, 5-methylpyridyl, thienyl, furyl, morpholino, tetrahydrofurfuryl).

Substituents of the substituent group V may form a structure in which a benzene ring or a naphthalene ring is fused.

Also, these substituents may be further substituted. The further substituent includes any substituent selected from the substituent group V.

In formula (1), m represents an integer of 1 or more. As described later, when Y is a polyvalent group, m is determined according to the valence of the polyvalent group.

More specifically, in formula (1), when Y is a carbon atom, m is 4. In the case where Y is a heteroatom, m is 3 when a nitrogen atom, and m is 2 when an oxygen atom or a sulfur atom. When Y is a hydrogen atom, a hydroxy group or a mercapto group, m is 1.

The heteroatom represented by Y in formula (1) is preferably a nitrogen atom, an oxygen atom, a sulfur atom or a selenium atom, more preferably a nitrogen atom, an oxygen atom or a sulfur atom.

The alkyl group-derived group represented by Y in formula (1) includes a monovalent (m=1) group, that is, an alkyl group, and a divalent (m=2) group, that is, an alkylene group, and further includes a group having three or more bonds. The same applies to the alkyl group present in the group derived from an alkoxy group.

The alkyl group-derived group represented by Y may be linear, branched or cyclic. The alkyl group-derived group represented by Y preferably has a carbon number of 1 to 60, more preferably a carbon number of 1 to 50, still more preferably a carbon number of 1 to 40.

Furthermore, in formula (1), the alkyl group-derived group represented by Y may be unsubstituted or may have a substituent. Examples of the substituent include the substituent group V. Among the substituent group V, a halogen atom (fluorine, chlorine, bromine, iodine), a hydroxy group, a mercapto group, an aryl group, a heteroaryl group, an acyl group, an alkoxy group, an amino group, a cyano group, a carboxyl group, a sulfo group, a carbamoyl group, a sulfamoyl group, a nitro group, an aryloxy group, an acyloxy group and an acylamino group are preferred, and a halogen atom (fluorine), a hydroxy group, a mercapto group, an acyl group, an alkoxy group, an aryl group, a heteroaryl group, a sulfo group and an aryloxy group are more preferred.

Specific examples of the alkyl group-derived group represented by Y include: when m=1, methyl, ethyl, tert-butyl, tert-octyl, 2-ethylhexyl, cyclohexyl, n-hexadecyl, 3-dodecyloxypropyl, perfluorobutyl and 3-(2',4'-di-tert-pentylphenoxy)propyl; when m=2, methylene, ethylene, methylhydroxymethylene and isobutylene; and when m=3, cyclohexanetriyl and cyclohexanetetrayl.

In formula (1), the acyl group-derived group represented by Y includes a monovalent (m=1) group such as formyl group and acetyl group, and a divalent (m=2) group, that is, a carbonyl group. The acyl group-derived group represented by Y in formula (1) preferably has a carbon number of 1 to 60, more preferably a carbon number of 1 to 50, still more preferably a carbon number of 1 to 40.

The acyl group-derived group represented by Y may be unsubstituted or may have a substituent. Examples of the substituent include the substituent group V. Among the substituent group V, a halogen atom (fluorine, chlorine, bromine, iodine), an alkyl group, a hydroxy group, a mercapto group, an aryl group, a heteroaryl group, an acyl group, an alkoxy group, an amino group, a cyano group, a carboxyl group, a sulfo group, a carbamoyl group, a sulfamoyl group, a nitro group, an aryloxy group, an acyloxy group and an acylamino group are preferred, and a halogen atom, an alkyl group, a hydroxy group, a mercapto group, an aryl group and a heteroaryl group are more preferred.

Specific examples of the acyl group-derived group represented by Y include: when m=1, acetyl, benzoyl, trichloroacetyl, phenylcarbonyl and ethylcarbonyl; and when the group is polyvalent, carbonyl.

In formula (1), the aryl group-derived group represented by Y includes a monovalent (m=1) group, that is, an aryl group (e.g., phenyl, naphthyl), a divalent (m=2) group, that is, an arylene group (e.g., phenylene, naphthylene), and a polyvalent group such as triyl group and tetrayl group. For example, the group derived from an unsubstituted phenyl group can take a monovalent to hexavalent form. The same applies to the aryl group present in the aryloxy group-derived group.

The aryl group-derived group represented by Y preferably has a carbon number of 6 to 60, more preferably a carbon number of 6 to 50, still more preferably a carbon number of 6 to 40.

Furthermore, the aryl group-derived group represented by Y may be unsubstituted or may have a substituent, and examples of the substituent include the substituent group V. Among the substituent group V, an alkyl group, an alkoxy group, a hydroxy group, a halogen atom (fluorine, chlorine, bromine, iodine), a mercapto group, an aryl group, a heteroaryl group, an acyl group, an amino group, a cyano group, a carboxyl group, a sulfo group, a carbamoyl group, a sulfamoyl group, a nitro group, an aryloxy group, an acyloxy group and an acylamino group are preferred. Also, the aryl group-derived group represented by Y may be a polymer such as polystyrene. The number of repeating units in the polymer is not particularly limited but, in view of solubility and antistatic property, the number of repeating units is preferably 1,000,000 or less, more preferably 100,000 or less. The substituent of the aryl group-derived group represented by Y is more preferably an alkyl group, an alkoxy group, a hydroxy group, a mercapto group, an acyl group, an amino group, a carboxyl group, a sulfo group or a nitro group.

Specific examples of the aryl group-derived group represented by Y include: when m=1, phenyl, 1-naphthyl, 4-tolyl, 4-methoxyphenyl, 4-hexadecyloxyphenyl, 3-pentadecylphenyl, 2,4-di-tert-pentylphenyl, 8-quinolyl and 5-(1-dodecyloxycarbonylethoxycarbonyl)-2-chlorophenyl; and when the group is polyvalent, o-phenylene, m-phenylene, p-phenylene, 1,4-naphthylene, 9,10-anthrylene and 2-pentadecyl-1,4-phenylene.

The heteroaryl group-derived group represented by Y in formula (1) includes a monovalent (m=1) group, that is, a heteroaryl group, a divalent (m=2) group, that is, a heteroarylene group, and a polyvalent group such as triyl group and tetrayl group.

In formula (1), the heteroaryl group in the heteroaryl group-derived group represented by Y is preferably a 5- to 8-membered heteroaryl group containing at least one of a nitrogen atom, a sulfur atom, an oxygen atom and a selenium atom, as a heteroatom. Also, substituents of the heteroaryl group may combine with each other to form a ring, for example, may form a fused ring together with an aromatic ring or the like.

Furthermore, the heteroaryl group-derived group represented by Y may be unsubstituted or may have a substituent. Examples of the substituent include the substituent group V. Among the substituent group V, an alkyl group, an alkoxy group, a hydroxy group, a halogen atom (fluorine, chlorine, bromine, iodine), a mercapto group, an aryl group, a heteroaryl group, an acyl group, an amino group, a cyano group, a carboxyl group, a sulfo group, a carbamoyl group, a sulfamoyl group, a nitro group, an aryloxy group, an arylthio group, an acyloxy group and an acylamino group are preferred, and an alkyl group, an alkoxy group, a hydroxy group, a mercapto group, an acyl group, an amino group, a carboxyl group, a sulfo group and a nitro group are more preferred.

Specific examples of the heteroaryl group-derived group represented by Y include: when m=1, pyridyl, furyl, pyrrole, thiazolyl, oxazolyl, imidazolyl, triazolyl, tetrazolyl, benzotriazolyl and quinolyl; and when the group is polyvalent, pyridinediyl, imidazolylene, pyrrolylene and isothiazolylene.

Also, the heteroaryl group-derived group represented by Y may form a salt structure by allowing the heteroatom to become an ion. Examples thereof include ammonium ion. In the case where the heteroatom is cation such as ammonium ion, the counter ion includes bromo ion, chloro ion, tetrafluoroborate ion, hexafluorophosphate ion, perchlorate ion and nitrate ion. In the case where the heteroatom is anion, the counter ion includes ammonium ion, sodium ion, potassium ion and calcium ion.

The amino group-derived group represented by Y in formula (1) is an amino group ($NH_2$—) when m=1, and an imino group (—NH—) when m=2, but a substituted amino group can be a polyvalent group depending on the substituent. For example, in the case of an alkylamino group, as described above, the alkyl group contained as a substituent can be a monovalent group or a polyvalent group.

In formula (1), the amino group-derived group represented by Y preferably has a carbon number of 1 to 100, more preferably a carbon number of 1 to 30, still more preferably a carbon number of 1 to 10.

The amino group-derived group represented by Y may be unsubstituted or may have a substituent. Examples of the substituent include the substituent group V. Among the substituent group V, a hydroxy group, a sulfo group, an alkyl group, an aryl group, a heteroaryl group, an alkoxy group, a halogen atom (fluorine, chlorine, bromine, iodine), a mercapto group and a carboxyl group are preferred, and a hydroxy group, a sulfo group and an alkyl group are more preferred.

Also, the amino group-derived group represented by Y may be ammonium ion. The counter ion includes bromo ion, chloro ion, tetrafluoroborate ion, hexafluorophosphate ion, perchlorate ion and nitrate ion.

In formula (1), the alkoxy group-derived group represented by Y includes a monovalent (m=1) group, that is, an alkoxy group (e.g., methoxy, ethoxy), and a group where the alkyl moiety of the alkoxy group is a polyvalent group. For example, in the case where the alkyl moiety is an alkylene group, the alkoxy group-derived group is a divalent (m=2)

group, and in the case of a triylalkane, tetraylalkane or the like, the group is a trivalent or higher valent (m≥3) group. Furthermore, when the alkoxy group has a substituent and is substituted with a divalent (m=2) substituent or a polyvalent substituent such as triyl group and tetrayl group, the alkoxy group-derived group becomes a polyvalent group. For example, an alkoxy group substituted with a trivalent substituent becomes a divalent (m=2) group.

The alkoxy group-derived group represented by Y in formula (1) is an alkoxy group preferably having a carbon number of 1 to 60, more preferably a carbon number of 1 to 50, still more preferably a carbon number of 1 to 40.

Furthermore, the alkoxy group-derived group represented by Y may be unsubstituted or may have a substituent, and examples of the substituent include the substituent group V. Among the substituent group V, an alkyl group, an alkoxy group, a hydroxy group, a halogen atom (fluorine, chlorine, bromine, iodine), a mercapto group, an aryl group, a heteroaryl group, an acyl group, an amino group, a cyano group, a carboxyl group, a sulfo group, a carbamoyl group, a sulfamoyl group, a nitro group, an aryloxy group, an arylthio group, an acyloxy group and an acylamino group are preferred, and an alkyl group, an alkoxy group, a hydroxy group, a mercapto group, an aryl group and a heteroaryl group are more preferred.

Specific examples of the alkoxy group-derived group represented by Y include: when m=1, methoxy, ethoxy, butoxy, methoxyethoxy and n-octyloxy; and when the group is polyvalent, ethylenedioxy and propylenedioxy.

In formula (1), the aryloxy group-derived group represented by Y includes a monovalent (m=1) group, that is, an aryloxy group (e.g., phenoxy), and a group where the aryl moiety of the aryloxy group is polyvalent. For example, in the case where the aryl moiety is trivalent and is an arylene group, the aryloxy group-derived group becomes a divalent (m=2) group.

Furthermore, in the case where the aryloxy group has a substituent and is substituted with a polyvalent substituent such as triyl group and tetrayl group, the aryloxy group-derived group becomes a polyvalent group. For example, an aryloxy group substituted with a triyl alkyl group-derived group becomes a divalent (m=2) group.

In formula (1), the aryloxy group-derived group represented by Y is an aryloxy group preferably having a carbon number of 6 to 60, more preferably a carbon number of 6 to 50, still more preferably a carbon number of 6 to 40.

Furthermore, the aryloxy group-derived group represented by Y may be unsubstituted or may have a substituent, and examples of the substituent include the substituent group V. Among the substituent group V, an alkyl group, an alkoxy group, a hydroxy group, a halogen atom (fluorine, chlorine, bromine, iodine), a mercapto group, an aryl group, a heteroaryl group, an acyl group, an amino group, a cyano group, a carboxyl group, a sulfo group, a carbamoyl group, a sulfamoyl group, a nitro group, an aryloxy group, an arylthio group, an acyloxy group and an acylamino group are preferred, and an alkyl group, an alkoxy group, a hydroxy group, a mercapto group, an amino group, a carboxyl group and a sulfo group are more preferred.

Specific examples of the aryloxy group-derived group represented by Y include: when m=1, phenoxy, 4-tert-octylphenoxy, naphthyloxy and pyrenyloxy; and when the group is polyvalent, p-phenylenedioxy, naphthylenedioxy and 2-n-hexyl-1,4-phenylenedioxy.

In formula (1), L represents a single bond, a divalent hydrocarbon group, a divalent heteroatom or an imino group.

In formula (1), the divalent hydrocarbon group represented by L preferably has a carbon number of 0 to 30, more preferably a carbon number of 0 to 20, still more preferably a carbon number of 0 to 10. The divalent hydrocarbon group represented by L may have a ring structure and/or an unsaturated bond in the hydrocarbon structure and is preferably a saturated hydrocarbon group.

Also, the divalent hydrocarbon group represented by L may be linear or branched and is preferably a linear hydrocarbon group.

Furthermore, the divalent hydrocarbon group represented by L may be unsubstituted or may have a substituent and is preferably an unsubstituted hydrocarbon group. Examples of the substituent include the substituent group V. Among the substituent group V, a halogen atom (fluorine, chlorine, bromine, iodine), a hydroxy group, a mercapto group, an aryl group, a heteroaryl group, an acyl group, an alkoxy group, an amino group, a cyano group, a carboxyl group, a sulfo group, a carbamoyl group, a sulfamoyl group, a nitro group, an aryloxy group, an acyloxy group and an acylamino group are preferred, and a halogen atom (fluorine), a hydroxy group, a mercapto group, an acyl group, an alkoxy group, an aryl group, a heteroaryl group, a sulfo group and an aryloxy group are more preferred.

The divalent hydrocarbon group represented by L is more preferably an unsubstituted linear hydrocarbon group, still more preferably an unsubstituted linear hydrocarbon group having a carbon number of 0 to 10.

In formula (1), the divalent heteroatom represented by L is an oxygen atom, a sulfur atom, a selenium atom or a nitrogen atom, preferably an oxygen atom, a sulfur atom or a selenium atom.

L in formula (1) is preferably a single bond, a divalent hydrocarbon group, an oxygen atom, an imino group (—NH—, —NR— (R represents an alkyl group, an aryl group or a heteroaryl group)), a sulfur atom or a selenium atom, more preferably a single bond or an unsubstituted linear divalent hydrocarbon group.

In formula (1), m is preferably 2 or more in terms of high effect of improving the durability (light resistance, heat resistance, wet heat resistance), particularly the light resistance.

Specific examples of the compound represented by formula (1) for use in the present invention are illustrated below, but the compound represented by formula (1) of the present invention is not limited to these specific examples.

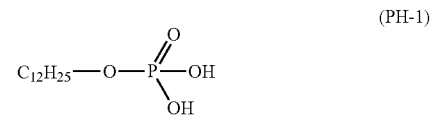

(PH-1)

(PH-2)

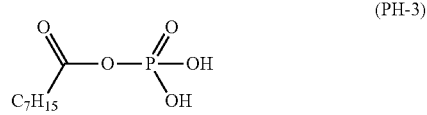

(PH-3)

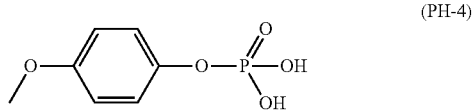

(PH-4)

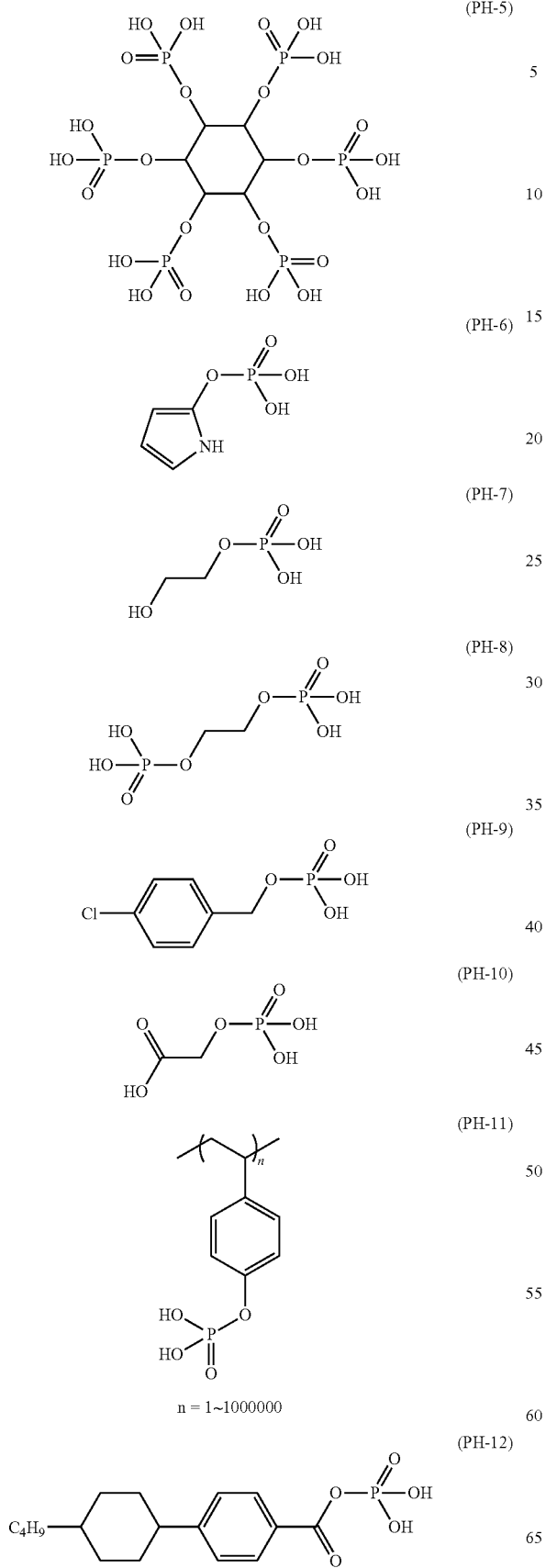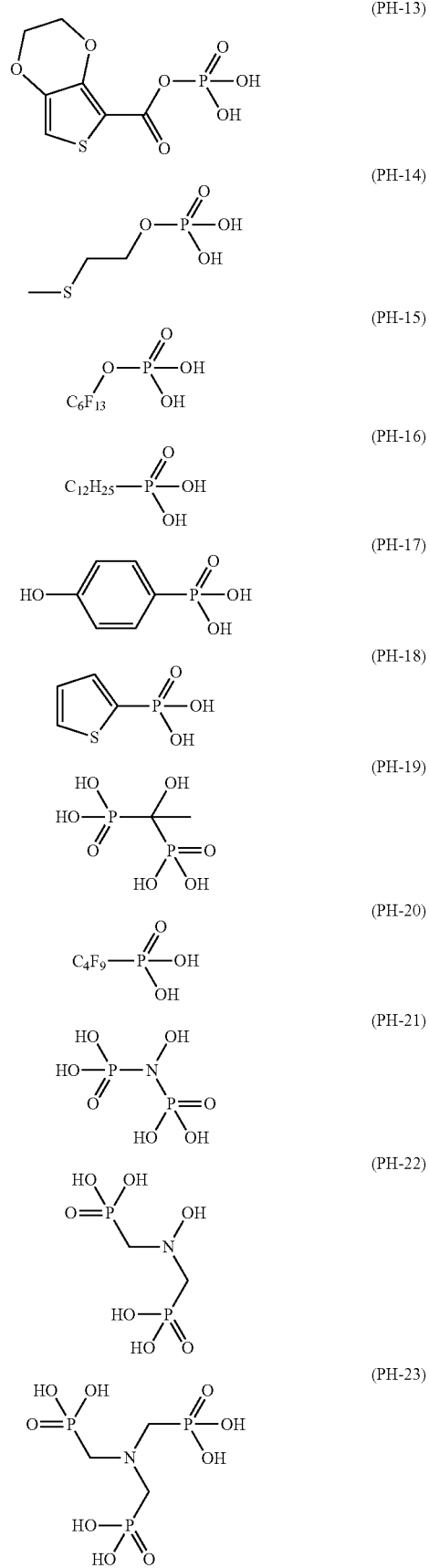

-continued

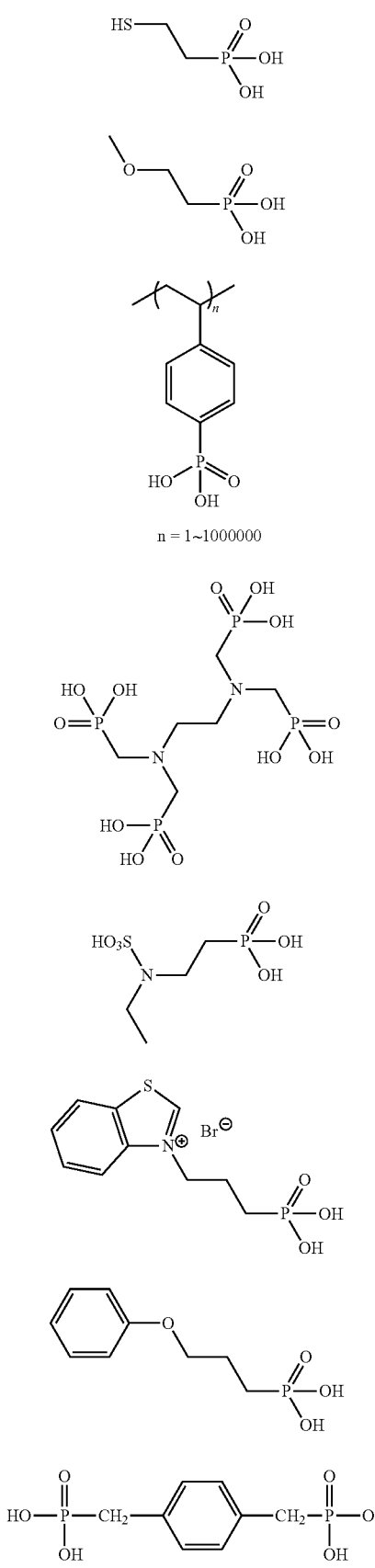

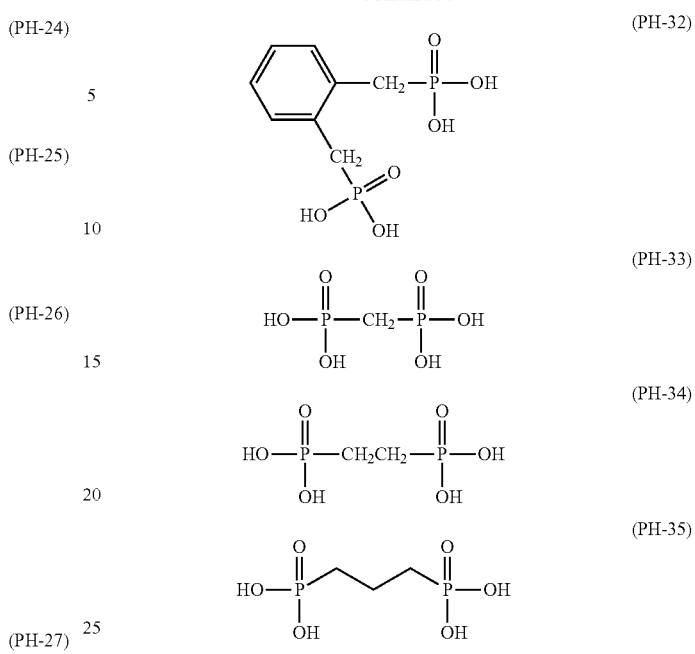

The compound represented by formula (1) can be synthesized by a known method. More specifically, a method of reacting an alcohol or halide corresponding to "Y-L$_m$" in formula (1) with diphosphorus pentoxide or phosphoric acid to synthesize the compound is suitably used. Also, some of the compounds represented by formula (1) are available as a commercial product, and examples thereof include 1-hydroxyethane-1,1-diphosphonic acid (produced by Tokyo Chemical Industry Co., Ltd.), nitrilotris(methylenephosphonic acid) (produced by Tokyo Chemical Industry Co., Ltd.), and phytic acid (produced by Tokyo Chemical Industry Co., Ltd.).

In view of improving the light resistance and heat resistance, the compound represented by formula (1) is preferably a phosphonic acid compound. The "phosphonic acid compound" as used herein indicates a compound where in formula (1), the atom directly bonded to the phosphorus atom (P) on the Y side is not an oxygen atom.

The ratio between the compound represented by formula (1) and the electrically conductive polymer in the antistatic layer may be any ratio, but from the standpoint of satisfying both high antistatic property and high durability, the ratio (compound represented by formula (1):electrically conductive polymer) is, in terms of mass ratio, preferably from 0.01:1.0 to 10:1, more preferably from 0.05:1.0 to 5.0:1, still more preferably from 0.05:1.0 to 1.0:1.0.

<Compound (2)>

The compound (2) is a compound represented by the following formula (2). The compound represented by the following formula (2) (compound (2) scarcely causes aggregation even when the compound is present together with the above-described electrically conductive polymer. Accordingly, an antistatic layer formed using a composition containing a compound represented by the following formula (2) and the electrically conductive polymer exhibits high transparency and good antistatic property and is excellent in the light resistance, heat resistance and wet heat resistance.

Formula (2)

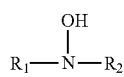

(2)

In formula (2), $R_1$ represents a hydrogen atom, an alkyl group, an acyl group, an aryl group, an alkoxy group, an aryloxy group or a heteroaryl group. In formula (2), $R_2$ represents a hydrogen atom, an alkyl group, an aryl group, a heteroaryl group or a sulfonyl group. The alkyl group, acyl group, aryl group, alkoxy group, aryloxy group, heteroaryl group and sulfonyl group may have a substituent.

$R_1$ and $R_2$ in formula (2) each may have a substituent. Examples of the substituent include the substituent group V.

The alkyl group represented by $R_1$ in formula (2) is preferably an alkyl group having a carbon number of 1 to 60, more preferably a carbon number of 1 to 50, still more preferably a carbon number of 1 to 40. Specific examples thereof include methyl, tert-butyl, tert-octyl, 2-ethylhexyl, cyclohexyl, n-hexadecyl, 3-dodecyloxypropyl and 3-(2',4'-di-tert-pentylphenoxy)propyl.

The acyl group represented by $R_1$ in formula (2) is preferably an acyl group having a carbon number of 1 to 60, more preferably a carbon number of 1 to 50, still more preferably a carbon number of 1 to 40. Specific examples thereof include acetyl, benzoyl, trichloroacetyl, phenylcarbonyl and ethylcarbonyl.

The aryl group represented by $R_1$ in formula (2) is preferably an aryl group having a carbon number of 6 to 60, more preferably a carbon number of 6 to 50, still more preferably a carbon number of 6 to 40. Specific examples thereof include phenyl, 1-naphthyl, p-tolyl, o-tolyl, 4-methoxyphenyl, 4-hexadecyloxyphenyl, 3-pentadecylphenyl, 2,4-di-tert-pentylphenyl, 8-quinolyl and 5-(1-dodecyloxycarbonylethoxycarbonyl)-2-chlorophenyl.

The alkoxy group represented by $R_1$ in formula (2) is preferably an alkoxy group having a carbon number of 1 to 60, more preferably a carbon number of 1 to 50, still more preferably a carbon number of 1 to 40. Specific examples thereof include methoxy, ethoxy, butoxy, methoxyethoxy and n-octyloxy.

The aryloxy group represented by $R_1$ in formula (2) is preferably an aryloxy group having a carbon number of 6 to 60, more preferably a carbon number of 6 to 50, still more preferably a carbon number of 6 to 40. Specific examples thereof include phenoxy and 4-tert-octylphenoxy.

The heteroaryl group represented by $R_1$ in formula (2) is preferably a 5- to 8-membered heteroaryl group containing at least one heteroatom selected from N, S, O and Se. Specific examples thereof include 4-pyridyl, 2-furyl, 2-pyrrole, 2-thiazolyl, 3-thiazolyl, 2-oxazolyl, 2-imidazolyl, triazolyl, tetrazolyl, benzotriazolyl, 2-quinolyl and 3-quinolyl.

The alkyl group represented by $R_2$ in formula (2) is preferably an alkyl group having a carbon number of 1 to 60, more preferably a carbon number of 1 to 50, still more preferably a carbon number of 1 to 40. Specific examples thereof include methyl, tert-butyl, tert-octyl, 2-ethylhexyl, cyclohexyl, n-hexadecyl, 3-dodecyloxypropyl and 3-(2',4'-di-tert-pentylphenoxy)propyl.

The aryl group represented by $R_2$ in formula (2) is preferably an aryl group having a carbon number of 6 to 60, more preferably a carbon number of 6 to 50, still more preferably a carbon number of 6 to 40. Specific examples thereof include phenyl, 1-naphthyl, p-tolyl, o-tolyl, 4-methoxyphenyl, 4-hexadecyloxyphenyl, 3-pentadecylphenyl, 2,4-di-tert-pentylphenyl, 8-quinolyl and 5-(1-dodecyloxycarbonylethoxycarbonyl)-2-chlorophenyl.

The heteroaryl group represented by $R_2$ in formula (2) is preferably a 5- to 8-membered heteroaryl group containing at least one heteroatom selected from among N, S, O and Se. Specific examples thereof include 4-pyridyl, 2-furyl, 2-pyrrole, 2-thiazolyl, 3-thiazolyl, 2-oxazolyl, 2-imidazolyl, triazolyl, tetrazolyl, benzotriazolyl, morpholinyl, and an acyl group (e.g., acetyl, butanoyl, dodecanoyl, benzoyl).

The sulfonyl group represented by $R_2$ in formula (2) is preferably a sulfonyl group having a carbon number of 1 to 60, more preferably a carbon number of 1 to 50, still more preferably a carbon number of 1 to 40. Specific examples thereof include phenylslufonyl, methylsulfonyl, ethylsulfonyl and propylsulfonyl.

$R_1$ and $R_2$ may be either the same or different, and $R_1$ and $R_2$ may combine with each other to form a ring.

From the standpoint that high antistatic property, light resistance and durability can be obtained while maintaining the strength and transparency of the coating film, the compound represented by formula (2) is preferably at least one compound selected from the group consisting of a hydroxamic acid compound and a hydroxyamine compound.

—Hydroxamic Acid Compound—

The hydroxamic acid compound is preferably a compound represented by the following formula (2-2).

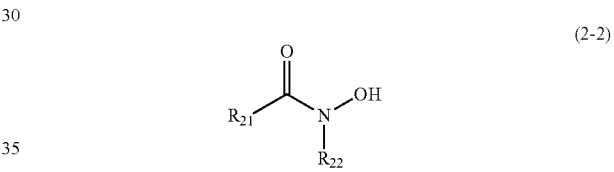

(2-2)

In formula (2-2), each of $R_{21}$ and $R_{22}$ is independently a hydrogen atom or a substituted or unsubstituted alkyl, aryl, heteroaryl, alkoxy or aryloxy group, preferably a substituted or unsubstituted alkyl or aryl group, more preferably a substituted or unsubstituted alkyl or phenyl group. These groups each may be unsubstituted or may have a substituent.

The alkyl group represented by $R_{21}$ in formula (2-2) is preferably an alkyl group having a carbon number of 1 to 60, more preferably an alkyl group having a carbon number of 1 to 50, still more preferably an alkyl group having a carbon number of 1 to 40. The alkyl group may be linear, branched or cyclic but is preferably a linear or branched alkyl group.

The alkyl group represented by $R_{21}$ in formula (2-2) may be further substituted, and the substituent is preferably a polyvinyl group, a polypropylene group, a polystyrene group, a fluorine atom, a chlorine atom, a sulfo group, a phosphonic group, a carboxy group, an alkoxycarbonyl group or an amino or ammonium group which may be substituted, more preferably a polyvinyl group, a polypropylene group, a polystyrene group, a fluorine atom, a sulfo group, a phosphonic group, a carboxy group, an alkoxycarbonyl group, an amino group or an ammonium group, still more preferably a sulfo group, a phosphonic group or a carboxy group. In the polyvinyl group, polypropylene group and polystyrene group as the substituent, the number of repeating units is preferably from 10 to 100,000, more preferably from 10 to 10,000, and in view of viscosity, still more preferably from 10 to 5,000.

The aryl group represented by $R_{21}$ in formula (2-2) is preferably an aryl group having a carbon number of 6 to 60, more preferably an aryl group having a carbon number of 6 to 30, still more preferably a phenyl group or a naphthyl group, yet still more preferably a phenyl group.

The aryl group represented by $R_{21}$ in formula (2-2) may be further substituted, and the substituent is preferably an alkyl group, a halogen atom, a sulfo group or a salt thereof, a phosphonic group, a carboxy group, a halogen atom, a hydroxy group, a heteroaryl group or an amino group which may be substituted, more preferably an alkyl group, a halogen atom, a sulfo group or a salt thereof, a phosphonic group, a carboxy group, a halogen atom or a hydroxy group, still more preferably an alkyl group, a carboxy group or a hydroxy group. The alkyl group as the substituent of the aryl group represented by $R_{21}$ preferably has a carbon number of 1 to 60, more preferably a carbon number of 1 to 40, still more preferably a carbon number of 1 to 30.

The number of substituents when $R_{21}$ is a phenyl group is preferably from 0 to 5, more preferably from 0 to 4. The substitution position of the substituent when $R_{21}$ is a phenyl group is not particularly limited but is preferably a meta-position or a para-position with respect to the carbonyl group in formula (2-2).

The heteroaryl group represented by $R_{21}$ in formula (2-2) has the same meaning as the heteroaryl group represented by $R_1$ in formula (2), and its preferred range is also the same.

The alkoxyl group represented by $R_{21}$ in formula (2-2) preferably has a carbon number of 1 to 60, more preferably a carbon number of 1 to 50, and still more preferably a carbon number of 1 to 40. The alkoxyl group represented by $R_{21}$ in formula (2-2) may be further substituted, and the substituent includes a hydroxy group, a phosphonic group, a sulfo group and a carboxy group.

The aryloxy group represented by $R_{21}$ in formula (2-2) is preferably an aryloxy group having a carbon number of 6 to 60, more preferably an aryloxy group having a carbon number of 6 to 50, still more preferably a phenyloxy group or a naphthyloxy group. The aryloxy group represented by $R_{21}$ in formula (2-2) may be further substituted, and the substituent is preferably a sulfo group, a phosphonic group, a carboxy group, a salt thereof, or an amino, alkyl, hydroxy, aryl or heteroaryl group which may be substituted, more preferably a sulfo group, a phosphonic group, a carboxy group, an amino group, an ammonium group, a hydroxy group or an alkyl group.

$R_{22}$ in formula (2-2) is preferably a hydrogen atom, an alkyl group, an aryl group or a heteroaryl group, more preferably a hydrogen atom, an alkyl group or an aryl group, still more preferably a hydrogen atom, an alkyl group or a phenyl group.

The alkyl group represented by $R_{22}$ in formula (2-2) is preferably an alkyl group having a carbon number of 1 to 60, more preferably an alkyl group having a carbon number of 1 to 50, and still more preferably an alkyl group having a carbon number of 1 to 40. The alkyl group represented by $R_{22}$ in formula (2-2) may be further substituted, and the substituent includes a hydroxy group, a phosphonic group, a sulfo group and a carboxy group.

The aryl group represented by $R_{22}$ in formula (2-2) is preferably an aryl group having a carbon number of 6 to 60, more preferably an aryl group having a carbon number of 6 to 50, still more preferably a phenyl group or a naphthyl group.

The aryl group represented by $R_{22}$ in formula (2-2) may be further substituted, and the substituent is preferably a sulfo group, a phosphonic group, a carboxy group, a salt thereof or an amino, alkyl, hydroxy, aryl or heteroaryl group which may be substituted, more preferably a sulfo group, a phosphonic group, a carboxy group, an amino group, an ammonium group, a hydroxy group or an alkyl group. The alkyl group as the substituent of the aryl group represented by $R_{22}$ preferably has a carbon number of 1 to 60, more preferably a carbon number of 1 to 50, still more preferably a carbon number of 1 to 40.

The number of substituents when $R_{22}$ in formula (2-2) is a phenyl group is preferably from 0 to 4, more preferably from 0 to 3. The substitution position of the substituent when $R_{22}$ in formula (2-2) is a phenyl group is not particularly limited but is preferably a meta-position or a para-position with respect to the carbonyl group in formula (2-2).

The heteroaryl group represented by $R_{22}$ in formula (2-2) has the same meaning as the heteroaryl group represented by $R_2$ in formula (1), and its preferred range is also the same.

—Hydroxyamine Compound—

The hydroxyamine compound is preferably a compound represented by the following formula (2-3).

$$(2\text{-}3)$$

In formula (2-3), each of $R_{31}$ and $R_{32}$ is independently a hydrogen atom or a substituted or unsubstituted alkyl, aryl, heteroaryl, alkoxy or aryloxy group, preferably a hydrogen atom or a substituted or unsubstituted alkyl or aryl group, more preferably a hydrogen atom or a substituted or unsubstituted alkyl or phenyl group.

The alkyl group represented by $R_{31}$ or $R_{32}$ in formula (2-3) is preferably an alkyl group having a carbon number of 1 to 60, more preferably an alkyl group having a carbon number of 1 to 50, still more preferably an alkyl group having a carbon number of 1 to 40. $R_{31}$ and $R_{32}$ may combine with each other to form a ring.

The alkyl group represented by $R_{31}$ or $R_{32}$ in formula (2-3) may be further substituted, and the substituent is preferably a hydroxy group, a sulfo group, a phosphonic group, a carboxy group, a polyvinyl group, a polypropylene group or a polystyrene group, more preferably a hydroxy group, a sulfo group, a phosphonic group, a carboxy group, an amino group, an ammonium group, a polyvinyl group, a polypropylene group or a polystyrene group, still more preferably a hydroxy group, a sulfo group, a phosphonic group or a carboxy group. In the polyvinyl group, polypropylene group and polystyrene group as the substituent, the number of repeating units is preferably from 10 to 100,000, more preferably from 10 to 10,000, and in view of viscosity, still more preferably from 10 to 5,000.

The aryl group represented by $R_{31}$ or $R_{32}$ in formula (2-3) is preferably an aryl group having a carbon number of 6 to 60, more preferably an aryl group having a carbon number of 6 to 50, still more preferably a phenyl group or a naphthyl group.

The aryl group represented by $R_{31}$ or $R_{32}$ in formula (2-3) may be further substituted, and the substituent is preferably a sulfo group, a phosphonic group, a carboxy group, an alkyl group, an aryl group, a hydroxy group, or an amino group which may be substituted, more preferably a sulfo group, a phosphonic group, a carboxy group, an alkyl group or a hydroxy group, still more preferably a sulfo group, a carboxy group or a hydroxy group. The alkyl group as the substituent of the aryl group represented by $R_{31}$ or $R_{32}$ preferably has a carbon number of 1 to 60, more preferably a carbon number of 1 to 50, still more preferably a carbon number of 1 to 40.

The number of substituents when $R_{31}$ is a phenyl group is preferably from 0 to 5, more preferably from 0 to 4. The substitution position of the substituent when $R_{31}$ or $R_{32}$ is a phenyl group is not particularly limited but is preferably a para-position with respect to the nitrogen atom in formula (2-3).

The heteroaryl group represented by $R_{31}$ or $R_{32}$ in formula (2-3) has the same meaning as the heteroaryl group represented by $R_2$ in formula (1), and its preferred range is also the same.

The alkoxyl group represented by $R_{31}$ or $R_{32}$ in formula (2-3) preferably has a carbon number of 1 to 60, more preferably a carbon number of 1 to 50, still more preferably a carbon number of 1 to 40. The alkoxyl group represented by $R_{32}$ in formula (2-3) may be further substituted, and the substituent includes a hydroxy group, a phosphonic group, a sulfo group and a carboxy group.

The aryloxy group represented by $R_{31}$ or $R_{32}$ in formula (2-3) is preferably an aryloxy group having a carbon number of 6 to 60, more preferably an aryloxy group having a carbon number of 6 to 50, still more preferably a phenyloxy group or a naphthyloxy group. The aryloxy group represented by $R_{32}$ in formula (2-3) may be further substituted, and the substituent is preferably a sulfo group, a phosphonic group, a carboxy group, a salt thereof, an amino group which may be substituted, an alkyl group, a hydroxy group, an aryl group or a heteroaryl group, more preferably a sulfo group, a phosphonic group, a carboxy group, an amino group, an ammonium group, a hydroxy group or an alkyl group.

$R_{31}$ and $R_{32}$ may be the same or different, but in view of easy availability, $R_{31}$ and $R_{32}$ are preferably the same.

Specific examples of the compound represented by formula (2) for use in the present invention are illustrated below, but the compound represented by formula (2) of the present invention is not limited to these specific examples.

Hydroxamic Acid Compound:

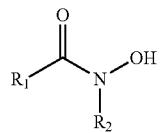

| | |
|---|---|
| HX-1 | $R_1 = CH_3$, $R_2 = H$ |
| HX-2 | $R_1 = C_2H_5$, $R_2 = H$ |
| HX-3 | $R_1 = C_3H_7$, $R_2 = H$ |
| HX-4 | $R_1 = C_4H_9$, $R_2 = H$ |
| HX-5 | $R_1 = C_7H_{15}$, $R_2 = H$ |
| HX-6 | $R_1 = C_9H_{19}$, $R_2 = H$ |
| HX-7 | $R_1 = C_{15}H_{31}$, $R_2 = H$ |
| HX-8 | $R_1 = CH_3$, $R_2 = CH_3$ |
| HX-9 | $R_1 = C_7H_{15}$, $R_2 = CH_3$ |
| HX-10 | $R_1 = C_9H_{19}$, $R_2 = CH_3$ |
| HX-11 | $R_1 = C_{15}H_{31}$, $R_2 = C_2H_5$ |
| HX-12 | $R_1 = CF_2CF_2CF_3$, $R_2 = CH_3$ |
| HX-13 | $R_1 = (CH_2)_2CO_2CH_3$, $R_2 = CH_3$ |
| HX-14 | $R_1 = CH_2N(CH_3)_2$, $R_2 = CH_3$ |
| HX-15 | $R_1 = (CH_2)_3N^+(CH_3)_3$—$Br^-$, $R_2 = CH_3$ |
| HX-16 | $R_1 = (CH_2)_3SO_3H$, $R_2 = CH_3$ |
| HX-17 | $R_1 = (CH_2)_3COOH$, $R_2 = CH_3$ |
| HX-18 | $R_1 = (CH_2)_3PO(OH)_2$, $R_2 = CH_3$ |

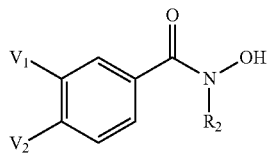

| | |
|---|---|
| HX-19 | $V_1 = H$, $V_2 = H$, $R_2 = H$ |
| HX-20 | $V_1 = H$, $V_2 = H$, $R_2 = CH_3$ |
| HX-21 | $V_1 = H$, $V_2 = H$, $R_2 = Ph$ |
| HX-22 | $V_1 = Cl$, $V_2 = H$, $R_2 = CH_3$ |
| HX-23 | $V_1 = CH_3$, $V_2 = H$, $R_2 = H$ |
| HX-24 | $V_1 = H$, $V_2 = OH$, $R_2 = C_2H_5$ |
| HX-25 | $V_1 = SO_3H$, $V_2 = H$, $R_2 = CH_3$ |
| HX-26 | $V_1 = SO_3Na$, $V_2 = H$, $R_2 = CH_3$ |
| HX-27 | $V_1 = COOH$, $V_2 = H$, $R_2 = CH_3$ |
| HX-28 | $V_1 = PO(OH)_2$, $V_2 = H$, $R_2 = CH_3$ |

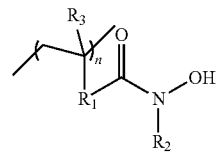

n = 1~10,000

| | |
|---|---|
| HX-29 | $R_1 = (CH_2)_4$, $R_2 = H$, $R_3 = H$ |
| HX-30 | $R_1 = (CH_2)_4$, $R_2 = CH_3$, $R_3 = H$ |
| HX-31 | $R_1 = (CH_2)_6$, $R_2 = CH_3$, $R_3 = CH_3$ |

HX-32

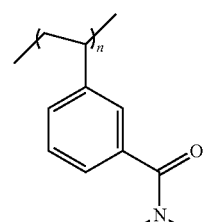

n = 1~10,000

HX-33

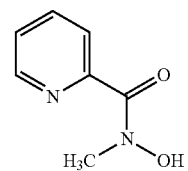

HX-34

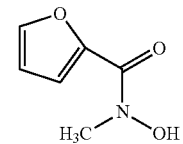

HX-35

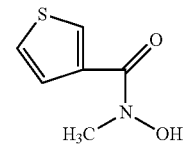

HX-36

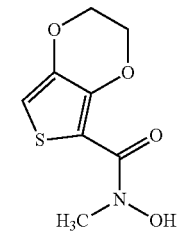

HX-37

HX-38

HX-39

HX-40

Hydroxyamine Compound:

$R_1, R_2$ structure with N-OH

| | |
|---|---|
| HA-1 | $R_1 = R_2 = CH_3$ |
| HA-2 | $R_1 = R_2 = H$ |
| HA-3 | $R_1 = Ph, R_2 = Ph$ |

HA-4 (N-OH pyrrolidine)

HA-5 (N-OH piperidine)

| | |
|---|---|
| HA-6 | $R_1 = R_2 = C_2H_5$ |
| HA-7 | $R_1 = R_2 = C_7H_{15}$ |
| HA-8 | $R_1 = R_2 = (CH_2)_6SO_3H$ |
| HA-9 | $R_1 = R_2 = (CH_2)_6OH$ |
| HA-10 | $R_1 = R_2 = (CH_2)_4COOH$ |
| HA-11 | $R_1 = R_2 = (CH_2)_4PO(OH)_2$ |
| HA-12 | $R_1 = C_6H_{13}, R_2 = C_2H_5$ |

$V_1$-C$_6$H$_4$-N(OH)R$_2$

| | |
|---|---|
| HA-13 | $V_1 = H, R_2 = CH_3$ |
| HA-14 | $V_1 = CH_3, R_2 = CH_3$ |
| HA-15 | $V_1 = OH, R_2 = Ph$ |
| HA-16 | $V_1 = SO_3H, R_2 = C_6H_4$—4-$SO_3H$ |
| HA-17 | $V_1 = COOH, R_2 = H$ |
| HA-18 | $V_1 = PO(OH)_2, R_2 = C_2H_5$ |

Polymer structure with $R_1, R_2, R_3$ $n = 1\sim10,000$

| | |
|---|---|
| HA-19 | $R_1 = (CH_2)_4, R_2 = CH_3, R_3 = H$ |
| HA-20 | $R_1 = (CH_2)_4, R_2 = CH_3, R_3 = CH_3$ |
| HA-21 | $R_1 = (CH_2)_6, R_2 = C_6H_5, R_3 = CH_3$ |

HA-22 (polystyrene-based N(OH)CH$_3$)

$n = 1\sim10,000$

HA-23 (pyridyl-N(OH)CH$_3$)

HA-24 (PhSO$_2$-N(OH)H)

HA-25 (PhSO$_2$-N(OH)CH$_3$)

HA-26 ($C_5H_{11}$-SO$_2$-N(OH)CH$_3$)

HA-27 ($C_5H_{11}$-O-N($C_2H_5$)-OH)

HA-28 (Ph-O-N(Ph)-OH)

The compound represented by formula (2) can be synthesized by a known method. More specifically, a method of reacting a hydroxylamine with a carboxylic acid halide or a carboxylic acid ester to synthesize the compound is suitably used. Also, some of the compounds represented by formula (2) are available as a commercial product, and examples thereof include acetohydroxamic acid (produced by Tokyo Chemical Industry Co., Ltd.), N-methylfurohydroxamic acid (produced by Tokyo Chemical Industry Co., Ltd.), benzohydroxamic acid (produced by Tokyo Chemical Industry Co., Ltd.) and octanohydroxamic acid (produced by Tokyo Chemical Industry Co., Ltd.).

The ratio between the compound represented by formula (2) of the present invention and the electrically conductive polymer may be any ratio but from the standpoint of satisfying both high electrical conductivity and high durability, the ratio (compound represented by formula (2): electrically conductive polymer) is, in terms of mass ratio, preferably from 0.01:1.0 to 100:1, more preferably from 0.05:1.0 to 10:1, still more preferably from 0.05:1.0 to 5.0:1.0.

The method for adding the compound represented by formula (2) may be any method. A method of mixing a liquid dispersion containing the electrically conductive polymer and a solution having dissolved therein the compound represented by formula (2) is preferred. This is described in detail later.

<Compound (3)>

The compound (3) contains a trivalent phosphorus compound. The trivalent phosphorus compound causes no aggregation even when coexists with the electrically conductive polymer of the present invention. Therefore, an antistatic layer formed using a composition containing a trivalent phosphorus compound and the electrically conductive polymer exhibits high transparency and good antistatic property and moreover, is excellent in the light resistance. Incidentally, while a polyphosphoric acid when added causes aggregation of the electrically conductive polymer, aggregation is not caused by a trivalent phosphorus compound. The reason therefor is presumed because the pH of the electrically conductive polymer composition does not change even when a trivalent phosphorus compound is added. However, the present invention is not limited by such a presumption.

The trivalent phosphorus compound is preferably a compound represented by the following formula (I), (II), (III) or (IV).

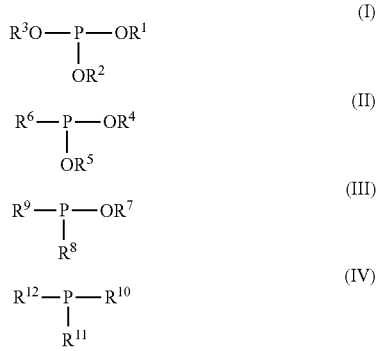

In formulae (I), (II), (III) and (IV), $R^1$, $R^2$, $R^3$, $R^4$, $R^5$, $R^6$, $R^7$, $R^8$, $R^9$, $R^{10}$, $R^{11}$ and $R^{12}$ each independently represents a hydrogen atom or a substituted or unsubstituted alkyl, aryl or heteroaryl group and is preferably a substituted or unsubstituted alkyl, aryl or heteroaryl group in terms of giving high light resistance, and more preferably a substituted or unsubstituted alkyl group in view of solubility.

$R^1$, $R^2$, $R^3$, $R^4$, $R^5$, $R^6$, $R^7$, $R^8$, $R^9$, $R^{10}$, $R^{11}$ and $R^{12}$ may combine with each other to form a ring.

The alkyl group, aryl group and heteroaryl group represented by $R^1$ to $R^{12}$ may have a substituent. Examples of the substituent include the substituent group V.

The alkyl group represented by $R^1$ to $R^{12}$ is preferably a substituted or unsubstituted alkyl group having a carbon number of 1 to 60, more preferably a carbon number of 1 to 50, still more preferably a carbon number of 1 to 40.

The alkyl group represented by $R^1$ to $R^{12}$ may be linear, branched or cyclic, but in view of cost and solubility, a linear or branched alkyl group is preferred.

As for the substituent of the alkyl group represented by $R^1$ to $R^{12}$, among the substituent group V, an alkyl group, an aryl group, an alkoxy group, a halogen atom, a hydroxy group, a substituted or unsubstituted amino group, a carboxyl group, a phosphoric acid group and a sulfo group are preferred; an alkyl group, an alkoxy group, a hydroxy group, a substituted amino group, a carboxyl group, a phosphoric acid group and a sulfo group are more preferred; and a hydroxy group, a substituted amino group, a phosphoric acid group and a sulfo group are still more preferred.

Specific examples of the alkyl group represented by $R^1$ to $R^{12}$ include methyl, ethyl, propyl, butyl, pentyl, octyl, 2-ethylhexyl, cyclohexyl, hexadecyl, 3-dodecyloxypropyl and 3-(2',4'-di-tert-pentylphenoxy)propyl.

The aryl group represented by $R^1$ to $R^{12}$ is preferably a substituted or unsubstituted aryl group having a carbon number of 6 to 60, more preferably a carbon number of 6 to 50, still more preferably a carbon number of 6 to 40.

As for the substituent of the aryl group represented by $R^1$ to $R^{12}$, among the substituent group V, an alkyl group, an aryl group, an alkoxy group, a halogen atom, a hydroxy group, a substituted or unsubstituted amino group, a carboxyl group, a phosphoric acid group and a sulfo group are preferred; an alkyl group, an alkoxy group, a hydroxy group, a substituted amino group, a carboxyl group, a phosphoric acid group and a sulfo group are more preferred; and a hydroxy group, a substituted amino group, a phosphoric acid group and a sulfo group are still more preferred.

In the case where the aryl group represented by $R^1$ to $R^{12}$ is a phenyl group, the substitution position of the substituent on the phenyl group is not particularly limited, but when the number of substituents is 1, the phenyl group preferably has the substituent at the 4-position from the standpoint of giving high light resistance, and when the number of substituents is 2, the phenyl group preferably has the substituents at the 2,6-position and the 3,5-position.

Specific examples of the aryl group represented by $R^1$ to $R^{12}$ include phenyl, 1-naphthyl, p-tolyl, o-tolyl, 4-methoxyphenyl, 4-hexadecyloxyphenyl, 3-pentadecylphenyl, 2,4-di-tert-pentylphenyl, 8-quinolyl and 5-(1-dodecyloxycarbonylethoxycarbonyl)-2-chlorophenyl.

The heteroaryl group represented by $R^1$ to $R^{12}$ is preferably a 5- to 8-membered heteroaryl group containing at least one heteroatom selected from N, S, O and Se. Specific examples thereof include 4-pyridyl, 2-furyl, 2-pyrrole, 2-thiazolyl, 3-thiazolyl, 2-oxazolyl, 2-imidazolyl, triazolyl, tetrazolyl, benzotriazolyl, 2-quinolyl and 3-quinolyl.

In view of solubility, the trivalent phosphorus compound is preferably a compound represented by formula (I). R', $R^2$ and $R^3$ in formula (I) may be the same or different and are preferably the same from the standpoint of cost and easy availability. Each of $R^1$, $R^2$ and $R^3$ in formula (I) is preferably a substituted or unsubstituted alkyl group in view of solubility, more preferably an alkyl group having no substituent from the standpoint of cost.

The trivalent phosphorus compound may be a salt compound. The functional group forming such a salt includes an ammonium group and a sulfonium group. The counter ion includes an anionic counter ion (e.g., $Cl^-$, $Br^-$, $I^-$, $ClO_4^-$, $PF_6^-$, $AsF_6^-$, $SbF_6^-$, $BF_4^-$, various sulfonate anions) for an ammonium group and a cationic counter ion (e.g., Na$^+$, K$^+$, Mg$^{2+}$) for a sulfonium group.

Specific examples of the trivalent phosphorus compound for use in the present invention are illustrated below, but the present invention is not limited to these specific examples.

$$P{-}(OR)_3$$

| | |
|---|---|
| PA-1 | R = CH$_3$ |
| PA-2 | R = C$_2$H$_5$ |
| PA-3 | R = n-C$_3$H$_7$ |
| PA-4 | R = n-C$_4$H$_9$ |
| PA-5 | R = t-C$_4$H$_9$ |
| PA-6 | R = n-C$_5$H$_{11}$ |
| PA-7 | R = n-C$_7$H$_{14}$COOH |
| PA-8 | R = (CH$_2$)$_2$Cl |
| PA-9 | R = n-C$_{11}$H$_{22}$OH |

PA-10 R = [structure with C$_2$H$_5$ branch and SO$_3$H]

PA-11 R = [structure with OCH$_3$ ether group: CH$_2$CH$_2$OCH$_2$CH$_3$]

PA-12 R = [structure: CH$_2$C(=O)OCH$_2$CH$_3$]

PA-13 R = [structure with PO(OH)$_2$]

PA-14 R = [perfluorinated chain ending in CF$_3$]

[Structure: P{-}(O-phenyl with V$_1$-V$_5$ substituents)$_3$]

| | V1 | V2 | V3 | V4 | V5 |
|---|---|---|---|---|---|
| PA-15 | H | H | H | H | H |
| PA-16 | H | H | CH$_3$ | H | H |
| PA-17 | H | H | n-C$_9$H$_{19}$ | H | H |
| PA-18 | H | H | OCH$_3$ | H | H |
| PA-19 | H | Cl | Cl | H | H |
| PA-20 | CH$_3$ | H | H | H | CH$_3$ |
| PA-21 | CH$_3$ | H | CH$_3$ | H | CH$_3$ |
| PA-22 | H | H | Ph | H | H |
| PA-23 | H | OH | OH | OH | H |
| PA-24 | H | H | NH$_2$ | H | H |
| PA-25 | H | H | COOH | H | H |
| PA-26 | H | H | SO$_3$H | H | H |
| PA-27 | H | H | PO(OH)$_2$ | H | H |
| PA-28 | CH$_3$ | CH$_3$ | CH$_3$ | CH$_3$ | CH$_3$ |

PA-29 [structure: P{-}(O-2-pyridyl)$_3$]

PA-30 [structure: P{-}(O-quinolinyl)$_3$]

PA-31 [structure: P{-}(O-thienyl)$_3$]

$$R^1O{-}P{-}(OR^2)_2$$

| | |
|---|---|
| PA-32 | R$^1$ = CH$_3$, R$^2$ = C$_2$H$_5$ |
| PA-33 | R$^1$ = Ph, R$^2$ = C$_2$H$_5$ |
| PA-34 | R$^1$ = n-C$_{13}$H$_{27}$, R$^2$ = C$_2$H$_5$ |

PA-35 [bicyclic phosphite structure with C$_2$H$_5$]

[Spiro bis-phosphite structure: R{-}O{-}P(O-CH$_2$)$_2$C(CH$_2$-O)$_2$P{-}O{-}R]

| | |
|---|---|
| PA-36 | R = n-C$_{18}$H$_{37}$ |
| PA-37 | R = n-C$_{10}$H$_{21}$ |

[Polymer structure with R$_1$, R$_2$, R$_3$ and phosphite group, OR$_3$, OR$_2$]

n = 1~10,000

| | |
|---|---|
| PA-38 | R$_1$ = (CH$_2$)$_4$, R$_2$ = CH$_3$, R$_3$ = CH$_3$ |
| PA-39 | R$_1$ = (CH$_2$)$_4$, R$_2$ = C$_6$H$_5$, R$_3$ = C$_6$H$_5$ |

PA-40 [polymer structure with phenoxy-P(OEt)$_2$ pendant]

n = 1~10,000

$$P{-}(OR)_3$$

PA-41  R = n-C$_7$H$_{14}$N$^+$Et$_3$ Cl$^-$

PA-42  R = [structure with C$_2$H$_5$ branch and SO$_3$Na]

-continued

PA-43 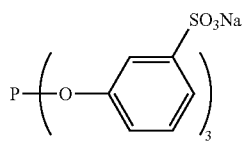

{ indicates a bonding position.

P—(R)₃

| | |
|---|---|
| PB-1 | R = CH₃ |
| PB-2 | R = C₂H₅ |
| PB-3 | R = n-C₃H₇ |
| PB-4 | R = n-C₄H₉ |
| PB-5 | R = t-C₄H₉ |
| PB-6 | R = n-C₅H₁₁ |
| PB-7 | R = n-C₇H₁₄COOH |
| PB-8 | R = n-C₉H₁₉ |
| PB-9 | R = n-C₁₁H₂₂OH |

PB-10 R = 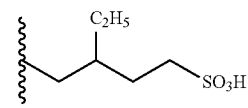

PB-11 R = 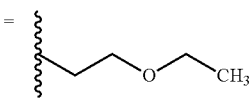

PB-12 R = 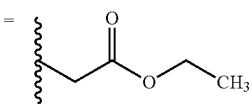

PB-13 R = 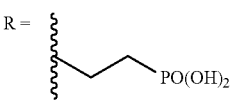

PB-14 R = 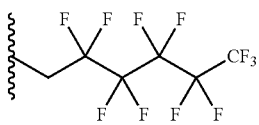

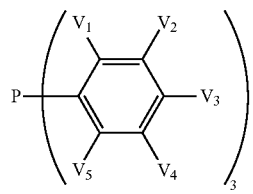

| | V1 | V2 | V3 | V4 | V5 |
|---|---|---|---|---|---|
| PB-15 | H | H | H | H | H |
| PB-16 | H | H | CH₃ | H | H |
| PB-17 | H | H | n-C₉H₁₉ | H | H |
| PB-18 | H | H | OCH₃ | H | H |
| PB-19 | H | Cl | Cl | H | H |
| PB-20 | CH₃ | H | H | H | CH₃ |
| PB-21 | CH₃ | H | CH₃ | H | CH₃ |
| PB-22 | H | H | Ph | H | H |
| PB-23 | H | OH | OH | OH | H |
| PB-24 | H | H | NH₂ | H | H |
| PB-25 | H | H | COOH | H | H |
| PB-26 | H | H | SO₃H | H | H |
| PB-27 | H | H | PO(OH)₂ | H | H |
| PB-28 | CH₃ | CH₃ | CH₃ | CH₃ | CH₃ |

PB-29 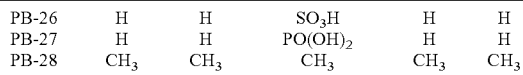

PB-30 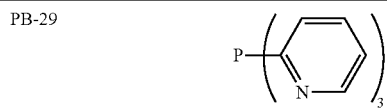

PB-31 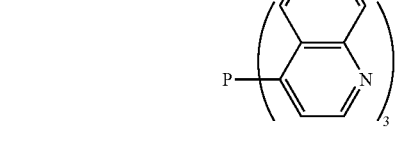

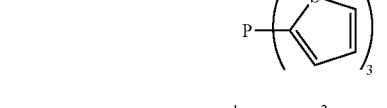

| | |
|---|---|
| PB-32 | R¹ = CH₃, R² = C₂H₅ |
| PB-33 | R¹ = Ph, R² = C₂H₅ |
| PB-34 | R¹ = n-C₁₃H₂₇, R² = C₂H₅ |

PB-35 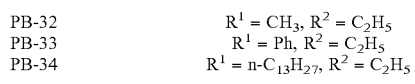

PB-36 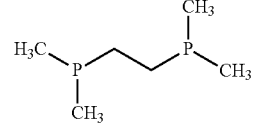

PB-37 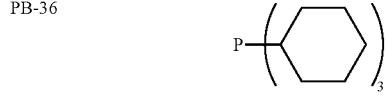

n = 1~10,000

| | |
|---|---|
| PB-38 | R₁ = (CH₂)₄, R₂ = CH₃, R₃ = CH₃ |
| PB-39 | R₁ = (CH₂)₄, R₂ = C₆H₅, R₃ = C₆H₅ |

PB-40 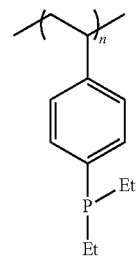

n = 1~10,000

P—(R)₃

-continued

| | |
|---|---|
| PB-41 | R = n-C$_7$H$_{14}$N$^+$Et$_3$ Cl$^-$ |
| PB-42 | 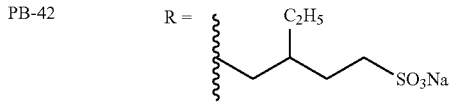 |
| PB-43 | 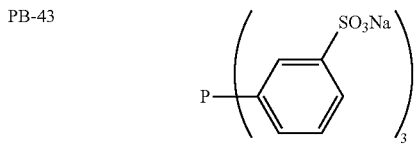 |

⁂ indicates a bonding position.

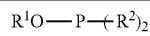

| | |
|---|---|
| PC-1 | R$^1$ = CH$_3$, R$^2$ = CH$_3$ |
| PC-2 | R$^1$ = C$_2$H$_5$, R$^2$ = C$_2$H$_5$ |
| PC-3 | R$^1$ = C$_5$H$_{11}$, R$^2$ = C$_4$H$_9$ |
| PC-4 | R$^1$ = C$_2$H$_4$OH, R$^2$ = C$_2$H$_5$ |
| PC-5 | R$^1$ = C$_2$H$_4$SO$_3$H, R$^2$ = Ph |
| PC-6 | R$^1$ = Ph, R$^2$ = Ph |
| PC-7 | R$^1$ = Ph, R$^2$ = C$_6$H$_4$—4-OH |
| PC-8 | R$^1$ = Ph, R$^2$ = C$_6$H$_4$—4-PO(OH)$_2$ |

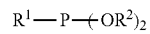

| | |
|---|---|
| PD-1 | R$^1$ = CH$_3$, R$^2$ = CH$_3$ |
| PD-2 | R$^1$ = C$_2$H$_5$, R$^2$ = C$_2$H$_5$ |
| PD-3 | R$^1$ = C$_5$H$_{11}$, R$^2$ = C$_4$H$_9$ |
| PD-4 | R$^1$ = C$_2$H$_4$OH, R$^2$ = C$_2$H$_5$ |
| PD-5 | R$^1$ = C$_2$H$_4$SO$_3$H, R$^2$ = Ph |
| PD-6 | R$^1$ = Ph, R$^2$ = Ph |
| PD-7 | R$^1$ = Ph, R$^2$ = C$_6$H$_4$—4-OH |
| PD-8 | R$^1$ = Ph, R$^2$ = C$_6$H$_4$—4-PO(OH)$_2$ |

The trivalent phosphorus compound can be synthesized by a known method. More specifically, the methods described in G. M. Kosolapoff and L. Maier (compilers), *Organic Phosphorus Compounds*, John Wiley & Sons Inc. (1973) and JP-A-2004-256456 are preferably used. Also, some trivalent phosphorus compounds are available as a commercial product, and examples thereof include Phosphorous Acid Tris(2-chloroethyl) Ester (produced by Tokyo Chemical Industry Co., Ltd.), Tris(2-ethylhexyl) Phosphite (produced by Tokyo Chemical Industry Co., Ltd.), Trihexyl Phosphite (produced by Tokyo Chemical Industry Co., Ltd.), Triisodecyl Phosphite (produced by Tokyo Chemical Industry Co., Ltd.), Trimethyl Phosphite (produced by Tokyo Chemical Industry Co., Ltd.), Tri-n-octadecyl Phosphite (produced by Tokyo Chemical Industry Co., Ltd.), Trimethylolpropane Phosphite (produced by Tokyo Chemical Industry Co., Ltd.), 1,2-Bis(dimethylphosphino)ethane (produced by Tokyo Chemical Industry Co., Ltd.), Tributylphosphine (produced by Tokyo Chemical Industry Co., Ltd.), Tri-n-octylphosphine (produced by Tokyo Chemical Industry Co., Ltd.), Trihexylphosphine (produced by Tokyo Chemical Industry Co., Ltd.), Tricyclohexylphosphine (produced by Tokyo Chemical Industry Co., Ltd.) and Tris(2-carboxyethyl)phosphine Hydrochloride (produced by Tokyo Chemical Industry Co., Ltd.).

The blending ratio between the trivalent phosphorus compound and the electrically conductive polymer may be any ratio, but from the standpoint of satisfying both high electrical conductivity and high durability, the ratio (trivalent phosphorus compound:electrically conductive polymer) is, in terms of mass ratio, preferably from 0.01:1.0 to 100:1, more preferably from 0.05:1.0 to 10:1, still more preferably from 0.05:1.0 to 5.0:1.0.

The method for adding the trivalent phosphorus compound may be any method. A method of mixing a liquid dispersion containing the electrically conductive polymer and a solution having dissolved therein the trivalent phosphorus compound is preferred. This is described in detail later.

The compounds represented by compounds (1) to (3) are preferably used in combination so as to enhance the light resistance and heat resistance. In particular, a combination use of the compound (1) and the compound (2), and a combination use of the compound (1) and the compound (3) are preferred.

In the case of using the compound (1) and the compound (2) in combination, the blending ratio between the compound (1) and the compound (2) may be any ratio, but the ratio (compound (1):compound (2)) is preferably from 10:1 to 1:10, more preferably from 5:1 to 1:1.

In the case of using the compound (1) and the compound (3) in combination, the blending ratio between the compound (1) and the compound (3) may be any ratio, but the ratio (compound (1):compound (3)) is preferably from 10:1 to 1:10, more preferably from 5:1 to 1:1.

(Other Additives)

—Dopant—

From the standpoint that the dispersibility in a solvent at the preparation of a composition for forming the antistatic layer of the present invention is improved, the antistatic layer preferably contains at least one kind of a dopant. The antistatic layer is preferably formed by coating as described later, and in view of the production, it is important to obtain a liquid dispersion (composition) having good dispersibility. Incidentally, the "dopant" as used in the present invention means an additive having an action of changing the electrical conductivity of the electrically conductive polymer. This dopant includes an electron-accepting (acceptor) dopant and an electron-donating (donor) dopant.

Examples of the electron-accepting (acceptor) dopant include a halogen (Cl$_2$, Br$_2$, I$_2$, ICl, ICl$_3$, IBr, IF), a Lewis acid (PF$_5$, AsF$_5$, SbF$_5$, BF$_3$, BCl$_3$, BBr$_3$, SO$_3$), a protic acid (e.g., HF, HCl, HNO$_3$, H$_2$SO$_4$, HClO$_4$, FSO$_3$H, ClSO$_3$H, CF$_3$SO$_3$H, various organic acids, amino acids), a transition metal compound (FeCl$_3$, FeOCl, TiCl$_4$, ZrCl$_4$, HfCl$_4$, NbF$_5$, NbCl$_5$, TaCl$_5$, MoF$_5$, MoCl$_5$, WF$_6$, WCl$_6$, UF$_6$, LnCl$_3$ (Ln is a lanthanide such as La, Ce, Pr, Nd and Sm), an electrolyte anion (Cl$^-$, Br$^-$, I$^-$, ClO$_4^-$, PF$_6^-$, AsF$_6^-$, SbF$_6^-$, various sulfonate anions), O$_2$, XeOF$_4$, (NO$_2^-$, BF$_4^+$)(SbF$_6^-$), (NO$_2^+$)(SbCl$_6^-$), (NO$_2^+$)(BF$_4^-$), FSO$_2$OOSO$_2$F, AgClO$_4$, H$_2$IrCl$_6$ and La(NO$_3$)$_3$.6H$_2$O.

Examples of the electron-donating (donor) dopant include an alkali metal (Li, Na, K, Rb, Cs), an alkaline earth metal (Ca, Sr, Ba), a lanthanides (e.g., Eu), and others (R$_4$N$^+$, R$_4$P$^+$, R$_4$As$^+$, R$_3$S$^+$, acetylcholine, wherein R is a substituted or unsubstituted hydrocarbon group).

Examples of the combination of the dopant and the electrically conductive polymer include:

(A) polyacetylene with I$_2$, AsF$_5$, FeCl$_3$ or the like;
(B) poly(p-phenylene) with AsF$_5$, K, AsF$_6^-$ or the like;
(C) polypyrrole with ClO$_4^-$ or the like;
(D) polythiophenes with ClO$_4^-$, a sulfonic acid compound, particularly polystyrenesulfonic acid, a nitrosonium salt, an aminium salt, quinones or the like;

(E) polyisothianaphthene with $I_2$ or the like;
(F) poly(p-phenylene sulfide) with $AsF_5$;
(G) poly(p-phenylene oxide) with $AsF_5$;
(H) polyaniline with HCl, a dodecylbenzenesulfonic acid or the like;
(I) poly(p-phenylenevinylene) with $H_2SO_4$ or the like;
(J) polythiophenylenevinylene with $I_2$ or the like;
(K) nickel phthalocyanine with $I_2$ or the like.

Among these combinations, the combinations (D) and (H) are preferred; the combination of polythiophenes (polythiophene and its derivative) with a sulfonic acid compound is more preferred in view of high stability of the doped state; and the combination of polythiophenes with a polystyrenesulfonic acid is still more preferred from the standpoint that preparation of a water dispersion is possible and an electrically conductive thin film can be easily prepared by coating.

The ratio between the electrically conductive polymer and the dopant may be any ratio, but from the standpoint of satisfying both the stability of doped state and the electrical conductivity, the ratio (electrically conductive polymer: dopant) is, in terms of mass ratio, preferably from 1.0:0.0000001 to 1.0:10, more preferably from 1.0:0.00001 to 1.0:1.0, still more preferably from 1.0:0.0001 to 1.0:0.5.

On the other hand, in order to enhance the dispersibility of the electrically conductive polymer, an ion-conductive polymer prepared by doping an electrolyte into a polymer chain may be used. Examples of the polymer chain include a polyether (e.g., polyethylene oxide, polypropylene oxide), a polyester (e.g., polyethylene succinate, poly-β-propiolactone), a polyamine (e.g., polyethyleneimine), and a polysulfide (e.g., polyalkylene sulfide). Examples of the electrolyte doped include various alkali metal salts.

Examples of the alkali metal ion constituting the alkali metal salt include $Li^+$, $Na^+$, $K^+$, $Rb^+$ and $Cs^+$, and examples of the anion forming the counter salt include $F^-$, $Cl^-$, $Br^-$, $I^-$, $NO_3^-$, $SCN^-$, $ClO_4^-$, $CF_3SO_3^-$, $BF_4^-$, $AsF_6^-$ and $BPh_4^-$.

Examples of the combination of the polymer chain and the alkali metal salt include a combination of polyethylene oxide with $LiCF_3SO_3$, $LiClO_4$ or the like, a combination of polyethylene succinate with $LiClO_4$, $LiBF_4$, poly-β-propiolactone, $LiClO_4$ or the like, a combination of polyethyleneimine with $NaCF_3SO_3$, $LiBF_4$ or the like, and a combination of polyalkylene sulfide with $AgNO_3$ or the like.

—Photopolymerization Initiator—

The composition for forming the antistatic layer in the present invention preferably contains a photopolymerization initiator. Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes and coumarins. Specific examples, preferred embodiments and commercial products of the photopolymerization initiator are described in JP-A-2009-098658, paragraphs [0133] to [0151], and these can be suitably used also in the present invention.

Various examples are also described in *Saishin UV Koka Gijutsu* (*Latest UV Curing Technology*), Technical Information Institute Co., Ltd., page 159 (1991), and Kiyomi Kato, *Shigaisen Koka System* (*Ultraviolet Curing System*), Sogo Gijutsu Center, pp. 65-148 (1989), and these are useful in the present invention.

(Surfactant)

Various surfactants are preferably used in the antistatic layer of the present invention. In general, a surfactant is added to suppress the thickness unevenness or the like resulting from variation in drying due to local distribution of the drying air. In the present invention, in addition to this effect, it has been found that surface unevenness of the antistatic layer or repellency of the coated material, which is estimated to be attributable to the compatibility of materials, can be improved. In particular, when the component (C) is added so as to improve the durability (light resistance, heat resistance, wet heat resistance), the coating film surface is sometimes roughened, but this roughening can be suppressed by using a surfactant in combination and both electrical conductivity and durability can be satisfied at a high level.

Specifically, the surfactant is preferably a fluorine-containing surfactant or a silicone-containing surfactant. Also, the surfactant is preferably an oligomer or a polymer rather than a low molecular compound.

When a surfactant is added, the surfactant swiftly moves and is unevenly distributed to the surface of the coated liquid film, and the surfactant remains unevenly distributed to the surface after drying, as a result, the surface energy of the antistatic layer to which the surfactant is added decreases by the effect of the surfactant. From the standpoint of preventing thickness non-uniformity, repellency or unevenness of the antistatic layer, the surface energy of the film is preferably lower.

The surface energy ($\gamma_S^v$, unit: mJ/m$^2$) of the layer can be experimentally determined using pure water $H_2O$ and methylene iodide $CH_2I_2$ on the layer by referring to D. K. Owens, *J. Appl. Polym. Sci.*, Vol. 13, page 1741 (1969). At this time, assuming that the contact angles for pure water and methylene iodide are $\theta_{H2O}$ and $\theta_{CH2I2}$, respectively, $\gamma_S^d$ and $\gamma_S^h$ are obtained according to the following simultaneous equations (1) and (2) and from the value $\gamma_S^v$ ($=\gamma_S^d+\gamma_S^h$) as the sum thereof, the energy-equivalent value (a value obtained by converting the mN/m unit into the mJ/m$^2$ unit) of surface tension of the antiglare layer is determined and defined as the surface energy. Before the measurement, the sample needs to be subjected to humidity conditioning under predetermined temperature and humidity conditions for a fixed time or more. The temperature here is preferably from 20 to 27° C., the humidity is preferably from 50 to 65 RH %, and the humidity conditioning time is preferably 2 hours or more.

$$1+\cos\theta_{H2O}=2\sqrt{\gamma_S^d}(\sqrt{\gamma_{H2O}^d}/\gamma_{H2O}^v)+2\sqrt{\gamma_S^h}(\sqrt{\gamma_{H2O}^h}/\gamma_{H2O}^v) \quad (1)$$

$$1\pm\cos\theta_{CH2I2}=2\sqrt{\gamma_S^d}(\sqrt{\gamma_{CH2I2}^d}/\gamma_{CH2I2}^v)+2\sqrt{\gamma_S^h}(\sqrt{\gamma_{CH2I2}^h}/\gamma_{CH2I2}^v) \quad (2)$$

wherein $\gamma_{H2O}^d=21.8°$, $\gamma_{H2O}^h=51.0°$, $\gamma_{H2O}^v=72.8°$, $\gamma_{CH2I2}^d=49.5°$, $\gamma_{CH2I2}^h=1.3°$ and $\gamma_{CH2I2}^v=50.8°$.

The surface energy of the antistatic layer is preferably 45 mJ/m$^2$ or less, more preferably from 20 to 45 mJ/m$^2$, still more preferably from 20 to 40 mJ/m$^2$. By setting the surface energy of the layer to 45 mJ/m$^2$ or less, an effect such as thickness uniformization or improved repellency on the antistatic layer can be obtained. However, in the case of further coating an upper layer such as low refractive index layer on the layer to which the surfactant is added, the surfactant is preferably a surfactant capable of dissolving out and moving into the upper layer, and the surface energy of the surfactant-added layer after immersion and washing of the layer with the solvent (e.g., methyl ethyl ketone, methyl isobutyl ketone, toluene, cyclohexanone) of the coating solution for the upper layer is preferably rather higher. The surface energy here is preferably from 35 to 70 mJ/m$^2$.

Preferred embodiments and specific examples of the fluorine-containing surfactant are described in JP-A-2007-102206, paragraphs [0023] to [0080], and the same applies to the present invention.

Preferred examples of the silicone-based compound include those having a substituent at the terminal and/or in the side chain of a compound chain containing a plurality of dimethylsilyloxy units as the repeating unit. The compound chain containing dimethylsilyloxy as the repeating unit may contain a structure unit other than dimethylsilyloxy. The substituents may be the same or different, and a plurality of substituents are preferably present. Preferred examples of the substituent include groups containing a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group.

The molecular weight is not particularly limited but is preferably 100,000 or less, more preferably 50,000 or less, still more preferably from 1,000 to 30,000, and most preferably from 1,000 to 20,000.

The silicon atom content of the silicone-based compound is not particularly limited but is preferably 18.0 mass % or more, more preferably from 25.0 to 37.8 mass %, and most preferably from 30.0 to 37.0 mass %.

Preferred examples of the silicon-based compound include, but are not limited to, "X-22-174DX", "X-22-2426", "X-22-164B", "X22-164C", "X-22-170DX", "X-22-176D" and "X-22-1821" (all trade names) produced by Shin-Etsu Chemical Co., Ltd.; "FM-0725", "FM-7725", "FM-4421", "FM-5521", "FM-6621" and "FM-1121" (all trade names) produced by Chisso Corp.; "DMS-U22", "RMS-033", "RMS-083", "UMS-182", "DMS-H21", "DMS-H31", "HMS-301", "FMS121", "FMS123", "FMS131", "FMS141" and "FMS221" (all trade names) produced by Gelest; "SH200", "DC11PA", "SH28PA", "ST80PA", "ST86PA", "ST97PA", "SH550", "SH710", "L7604", "FZ-2105", "FZ2123", "FZ2162", "FZ-2191", "FZ2203", "FZ-2207", "FZ-3704", "FZ-3736", "FZ-3501", "FZ-3789", "L-77", "L-720", "L-7001", "L-7002", "L-7604", "Y-7006", "SS-2801", "SS-2802", "SS-2803", "SS-2804" and "SS-2805" (all trade names) produced by Dow Corning Toray Co., Ltd.; and "TSF400", "TSF401", "TSF410", "TSF433", "TSF4450" and "TSF4460" (all trade names) produced by Momentive Performance Materials Inc.

—Translucent Particle—

In the antistatic layer for use in the present invention, various translucent particles can be used so as to impart antiglare property (surface scattering property) or internal scattering property.

The translucent particle may be either an organic particle or an inorganic particle. A smaller variation in the particle diameter leads to a smaller variation in the scattering property and makes it easier to design the haze value. The translucent particle is preferably a plastic bead, and a plastic bead having high transparency and giving the above-described value as a refractive index difference with the binder is more preferred.

Examples of the organic particle used include a polymethyl methacrylate particle (refractive index: 1.49), a crosslinked poly(acryl-styrene) copolymer particle (refractive index: 1.54), a melamine resin particle (refractive index: 1.57), a polycarbonate particle (refractive index: 1.57), a polystyrene particle (refractive index: 1.60), a crosslinked polystyrene particle (refractive index: 1.61), a polyvinyl chloride particle (refractive index: 1.60) and a benzoguanamine-melamine formaldehyde particle (refractive index: 1.68).

Examples of the inorganic particle include a silica particle (refractive index: 1.44), an alumina particle (refractive index: 1.63), a zirconia particle, a titania particle and an inorganic particle having hollows or pores.

Among these, a crosslinked polystyrene particle, a crosslinked poly((meth)-acrylate) particle and a crosslinked poly (acryl-styrene) particle are preferably used. The refractive index of the binder is adjusted according to the refractive index of the translucent particle selected from these particles, whereby the internal haze, surface haze and centerline average roughness of the present invention can be achieved.

Furthermore, a binder (refractive index after curing: from 1.50 to 1.53) mainly composed of a trifunctional or higher functional (meth)acrylate monomer and a translucent particle made from a crosslinked poly(meth)acrylate polymer having an acryl content of 50 to 100 wt % are preferably used in combination, and a combination of the binder and a translucent particle (refractive index: from 1.48 to 1.54) made from a crosslinked poly(styrene-acryl) copolymer is more preferred.

The refractive index of the binder component (in which a component other than a translucent particle is mixed) and the translucent particle is preferably from 1.45 to 1.70, more preferably from 1.48 to 1.65.

Also, in the present invention, the refractive index difference between the binder and the translucent particle (refractive index of translucent particle−refractive index of binder) is, in terms of the absolute value, preferably from 0.001 to 0.030, more preferably from 0.001 to 0.020, still more preferably from 0.001 to 0.015. If this difference exceeds 0.030, there arises a problem such as film character blurring, reduction in dark-room contrast, or surface clouding. The refractive index difference in the range above can be obtained by appropriately selecting the kind and amount ratio of the binder and the translucent particle. How to select can be easily known in advance by an experiment.

Here, the refractive index of the binder can be quantitatively evaluated by directly measuring the refractive index with an Abbe refractometer or by measuring a spectral reflection spectrum or a spectral ellipsometry. The refractive index of the translucent particle is determined as follows. The translucent particle is dispersed in an equal amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

In the case of such a translucent particle, the translucent particle is liable to precipitate in the binder and therefore, an inorganic filler such as silica may be added so as to prevent the precipitation. Addition of the inorganic filler in a larger amount is more effective in preventing the precipitation of the translucent particle but gives an adverse effect on the transparency of the coating film. Accordingly, an organic filler having a particle diameter of 0.5 μm or less is preferably added to the binder in an amount of approximately less than 0.1 mass % to such an extent as not impairing the transparency of the coating film.

The average particle diameter (on the volume basis) of the translucent particle is preferably from 0.5 to 20 μm, more preferably from 2.0 to 15.0 μm. If the average particle diameter is less than 0.5 μm, the distribution of light scattering angle extends to a wide angle and blurring of characters on the display may disadvantageously occur, whereas if it exceeds 20 μm, the thickness of the layer to which the translucent particle is added must be increased to cause a problem such as curl or rise in cost.

Two or more kinds of translucent particles differing in the particle diameter may be used in combination. The translucent particle having a larger particle diameter can impart an antiglare property, and the translucent particle having a smaller particle diameter can reduce the roughened texture on the surface.

The translucent particle is blended to account for 3 to 30 mass %, preferably from 5 to 20 mass %, based on the entire solid content of the layer to which the translucent particle is added. If the translucent particle content is less than 3 mass %, the effect by the addition is insufficient, whereas if it exceeds 30 mass %, there arises a problem such as blurring of the image or clouding or glaring of the surface.

The density of the translucent particle is preferably from 10 to 1,000 mg/m$^2$, more preferably from 100 to 700 mg/m$^2$.

The antistatic layer for use in the present invention may further contain the later-described solvent or other additives. Examples of the additive which can be further added include: a UV absorber, a phosphorous acid ester, a hydroxamic acid, a hydroxyamine, an imidazole, a hydroquinone and a phthalic acid, for the purpose of suppressing the decomposition of polymer; an inorganic fine particle, a polymer fine particle and a silane coupling agent, for the purpose of increasing the film strength; and a fluorine-based compound (particularly a fluorine-containing surfactant) for the purpose of reducing the refractive index and increasing the transparency.

[Composition for Antistatic Layer]

The composition for the antistatic layer in the present invention contains (A) an electrically conductive polymer, (B) a polyfunctional monomer having two or more polymerizable groups, (C) at least one kind of a compound (each compound alone or a combination of the compounds) selected from the compound (1), the compound (2) and the compound (3), (D) a photopolymerization initiator, and, if desired, other additives.

The preferred content of each component in the coating composition for forming the antistatic layer is described below. Incidentally, the "content" as used herein indicates a ratio (mass %) of the solid content of each component to the entire solid content in the coating composition.

The content of the component (A) is preferably from 0.1 to 20 mass %, more preferably from 0.1 to 12 mass %, and most preferably from 0.2 to 5 mass %.

The content of the component (B) is preferably from 60 to 99 mass %, more preferably from 75 to 99 mass %, and most preferably from 85 to 97 mass %.

The content of the component (C) is, as a total of the compounds 1 to 3, preferably from 0.1 to 10 mass %, more preferably from 0.1 to 5 mass %, and most preferably from 0.1 to 2 mass %.

The content of the component (D) is preferably from 1 to 10 mass %, more preferably from 1 to 5 mass %.

If the content of the component (A) is less than 0.1 mass %, the electrical conductivity is low and a sufficiently high antistatic effect cannot be obtained, whereas if it exceeds 20 mass %, the strength of the coat becomes weak or the coating film is colored, leading to reduction in the transmittance.

If the content of the component (B) is less than 50 mass %, the strength of the coating film may become weak.

If the content of the component (C) is less than 0.1 mass %, the effect of improving the heat resistance, wet heat resistance and light resistance cannot be obtained, whereas if it exceeds 10 mass %, the strength of the coating film may be decreased or deterioration of the surface state may result, such as whitening of the coating film due to bleeding or generation of surface unevenness on the coating film.

In the case where the coating composition contains a solvent, the solvent is preferably used such that the solid content concentration in the coating composition becomes from 1 to 70 mass %, more preferably from 3 to 60 mass %, and most preferably from 40 to 60 mass %.

[Antistatic Layer]

The refractive index of the antistatic layer in the present invention is preferably from 1.48 to 1.65, more preferably from 1.48 to 1.60, and most preferably from 1.48 to 1.55. A refractive index in this range is preferred, because interference unevenness with the substrate can be suppressed and when a low refractive index layer is stacked, the tint of reflected color can be made neutral.

The film thickness of the antistatic layer is preferably from 0.05 to 20 μm, more preferably from 2 to 15 μm, and most preferably from 5 to 10 μm. Within this range, both physical strength and electrical conductivity can be satisfied.

The transmittance of the antistatic layer is preferably 80% or more, more preferably 85% or more, and most preferably 90% or more.

The haze of the antistatic layer is, in the case of not containing a resin particle for imparting the antiglare property, preferably 3% or less, more preferably 2% or less, and most preferably 1% or less. In the case of containing a resin particle to impart the antiglare property, the haze is preferably from 0.1 to 30%, more preferably from 0.1 to 20%.

[Optical Film]

The hardness of the optical film of the present invention is preferably H or more, more preferably 2H or more, and most preferably 3H or more, in a pencil hardness test with a load of 500 g.

The common logarithmic value (Log SR) of the surface resistivity SR (Ω/sq) of the optical film of the present invention is preferably 13 or less, more preferably from 5 to 12, still more preferably from 6 to 12, yet still more preferably from 6 to 11. By setting the surface resistivity to the range above, an excellent dust-proof performance can be imparted.

In order to obtain such a surface resistivity, the content of the electrically conductive polymer (A) in the antistatic layer is preferably from 0.01 to 1.0 g/m$^2$, more preferably from 0.05 to 0.5 g/m$^2$, still more preferably from 0.1 to 0.3 g/m$^2$.

[Production Method of Optical Film]

The optical film of the present invention can be formed by the following method, but the present invention is not limited to this method. A composition for antistatic layer is prepared, and the composition is coated on a transparent support by a dip coating method, an air knife coating method, a curtain coating method, a roller coating method, a wire bar coating method, a gravure coating method, a die coating method or the like, and then heated/dried. A microgravure coating method, a wire bar coating method and a die coating method (see, U.S. Pat. No. 2,681,294 and JP-A-2006-122889) are preferred, and a die coating method is more preferred.

After the coating, the layer formed of the coating composition is cured by irradiating light, whereby an antistatic layer is formed. If desired, while other layers (for example, the later-described layers constituting the film, such as hardcoat layer and antiglare layer) are previously coated on the transparent support, the antistatic layer may be formed thereon. In this way, the optical film of the present invention is obtained.

[Layer Configuration of Optical Film]

The optical film of the present invention can be produced by providing an antistatic layer and a single or a plurality of functional layers required according to the purpose on a transparent support. The optical film includes an optical film having a hardcoat layer for increasing the physical strength of the film, and an optical film where layers are stacked by taking into consideration the refractive index, the film thickness, the number of layers, the order of layers and the like so as to reduce the reflectance by optical interference.

Incidentally, other functions can be added to the antistatic layer of the present invention. For example, an antistatic layer serving also as a low refractive index layer may be formed by adding a compound that works out to a low refractive index component. In order to impart a low refractive index performance to the antistatic layer of the present invention, the configuration described later in "Low Refractive Index Layer" can be applied. In addition, a hardcoat performance or an antiglare property can be imparted to the antistatic layer of the present invention.

Specific examples of the layer configuration for the optical film of the present invention are set forth below.

Transparent support/antistatic layer
Transparent support/antistatic layer/low refractive index layer
Transparent support/hardcoat layer/antistatic layer
Transparent support/antistatic layer/hardcoat layer
Transparent support/antiglare layer/antistatic layer
Transparent support/antistatic layer/antiglare layer
Transparent support/antistatic layer/high refractive index layer/low refractive index layer
Transparent support/antistatic layer/medium refractive index layer/high refractive index layer/low refractive index layer
Transparent support/antistatic layer/hardcoat layer/low refractive index layer
Transparent support/hardcoat layer/antistatic layer/low refractive index layer
Transparent support/antiglare layer/antistatic layer/low refractive index layer
Transparent support/antistatic layer/antiglare layer/low refractive index layer
Transparent support/hardcoat layer/antistatic layer/medium refractive index layer/high refractive index layer/low refractive index layer
Transparent support/antistatic layer/hardcoat layer/medium refractive index layer/high refractive index layer/low refractive index layer (Transparent Support)

The transparent support in the optical film of the present invention is preferably a transparent substrate film. The transparent substrate film includes a transparent resin film, a transparent resin plate, a transparent resin sheet, a transparent glass and the like and is not particularly limited. Examples of the transparent resin film include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film, a (meth) acrylonitrile film, a polyolefin, and a polymer having an alicyclic structure (e.g., norbornene-based resin (ARTON, trade name, produced by JSR Corporation), amorphous polyolefin (ZEONEX, trade name, produced by Nippon Zeon Co., Ltd.)). Among these, triacetyl cellulose, polyethylene terephthalate, and a polymer having an alicyclic structure are preferred, and triacetyl cellulose is more preferred.

A transparent support having a thickness of approximately from 25 to 1,000 μm may be usually used, but the thickness is preferably from 25 to 250 μm, more preferably from 30 to 90 μm.

The surface of the transparent support is preferably smooth and preferably has an average roughness Ra value of 1 μm or less. The average roughness value is preferably from 0.0001 to 0.5 μm, more preferably from 0.001 to 0.1 μm.

The transparent support is described in JP-A-2009-98658, paragraphs [0163] to [0169], and the same applies to the present invention.

(Hardcoat Layer)

In the optical film of the present invention, a hardcoat layer can be provided so as to impart the physical strength of the film. In the present invention, a hardcoat layer may not be provided, but a hardcoat layer is preferably provided, because the scratch resistance of the surface subjected a pencil scratch test or the like is increased.

In view of optical design to obtain an antireflection performance, the refractive index of the hardcoat layer in the present invention is preferably from 1.48 to 1.65, more preferably from 1.48 to 1.60, and most preferably from 1.48 to 1.55.

From the standpoint of imparting sufficiently high durability and impact resistance to the film, the film thickness of the hardcoat layer is from 0.5 to 20 μm, preferably from 1 to 10 μm, more preferably from 1 to 5 μm.

Also, the strength of the hardcoat layer is, in a pencil hardness test, preferably H or more, more preferably 2H or more, and most preferably 3H or more. Furthermore, in the Taber test in accordance with JIS K5400, the abrasion loss of the specimen between before and after the test is preferably smaller.

As the binder component for forming the hardcoat layer, the monomers described above with respect to the (B) polyfunctional monomer having two or more polymerizable unsaturated group can be suitably used.

For the purpose of imparting internal scattering property, the hardcoat layer may contain a matte particle, for example, an inorganic compound particle or a resin particle, having an average particle diameter of 1.0 to 10.0 μm, preferably from 1.5 to 7.0 μm.

For the purpose of controlling the refractive index of the hardcoat layer, monomers or inorganic particles having various refractive indexes, or both of them may be added to the binder of the hardcoat layer. The inorganic particle has an effect of suppressing curing shrinkage due to a crosslinking reaction, in addition to the effect of controlling the refractive index. The binder as referred to in the present invention is a binder inclusive of a polymer produced by the polymerization of, for example, the above-described polyfunctional monomer and/or high refractive index monomer after the formation of the hardcoat layer, and inorganic particles dispersed therein. Use of a silica fine particle as the inorganic particle for controlling the refractive index is preferred from the standpoint of suppressing the tint unevenness due to interference between the support and the hardcoat layer.

(Antiglare Layer)

In the present invention, separately from the antistatic layer, an antiglare layer may be formed for the purpose of imparting to the film an antiglare property thanks to surface scattering, and preferably a hardcoat performance so as to enhance the hardness and scratch resistance of the film.

The antiglare layer is described in JP-A-2009-98658, paragraphs [0178] to [0189], and the same applies to the present invention.

(High Refractive Index Layer and Medium Refractive Index Layer)

As described above, the refractive index of the high refractive index layer is preferably from 1.65 to 2.20, more preferably from 1.70 to 1.80. The refractive index of the medium refractive index layer is adjusted to a value between the refractive index of the low refractive index layer and the refractive index of the high refractive index layer. The refractive index of the medium refractive index layer is preferably from 1.55 to 1.65, more preferably from 1.58 to 1.63.

As for the method to form the high refractive index layer and the medium refractive index layer, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used, but a method by all-wet coating is preferred.

The medium refractive index layer and high refractive index layer are not particularly limited as long as they are a layer having a refractive index in the range above, but those known as the constituent component can be used, and specific examples thereof are described in JP-A-2008-262187, paragraphs [0074] to [0094].

(Low Refractive Index Layer)

The optical film of the present invention preferably has a low refractive index layer on the antistatic layer, directly or through another layer. In this case, the optical film of the present invention can function as an antireflection film.

The refractive index of the low refractive index layer is preferably from 1.30 to 1.51, more preferably from 1.30 to 1.46, still more preferably 1.32 to 1.38. Within this range, the reflectance can be kept low and the film strength can be maintained. As for the method to form the low refractive index layer, similarly to the above, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used, but a method by all-wet coating using a composition for low refractive index layer is preferred.

The low refractive index layer is not particularly limited as long as it is a layer having a refractive index in the range above, but those known as the constituent component can be used. Specifically, the composition containing a fluorine-containing curable resin and an inorganic fine particle described in JP-A-2007-298974, and the hollow silica fine particle-containing low refractive index coating described in JP-A-2002-317152, JP-A-2003-202406 and JP-A-2003-292831 can be suitably used.

Among those examples of the layer configuration, the optical film of the present invention preferably has a configuration where two layers of hardcoat layer (antiglare layer)/antistatic layer are stacked on a transparent support. At this time, a low refractive index layer and the like may be provided on the antistatic layer. Furthermore, two layers above are preferably formed using a method of simultaneously coating and forming two coated layers in one coating step.

When the film thickness of the antistatic layer is increased so as to obtain a high hardcoat performance while keeping constant the electrically conductive polymer content in the layer, the total amount of the electrically conductive polymer in the layer is increased and this tends to intensify the coloration and reduce the transmittance. Also, when the film thickness is increased, the electrically conductive polymer present in the lower part of the layer does not contribute to the effect of decreasing the surface resistance and therefore, the amount of the electrically conductive polymer used becomes large. Thanks to the above-described two-layer configuration of a hardcoat layer (antiglare layer) and an antistatic layer containing an electrically conductive polymer in a high density, an optical film satisfying all of high hardcoat performance, electrical conductivity and transmittance can be obtained.

At this time, by simultaneously coating and forming two layers of the hardcoat layer and the antistatic layer in one coating step, high productivity with a low cost can be achieved. As the method for simultaneously forming two layer in one coating step, a known method can be used. Specifically, the method described, for example, in JP-A-2007-293302, paragraphs [0032] to [0056], can be utilized.

[Protective Film for Polarizing Plate]

In the case of using the optical film as a surface protective film of a polarizing film (polarizing plate protective film), the adhesion to the polarizing film mainly composed of a polyvinyl alcohol can be improved by hydrophilizing the surface of the transparent support opposite the side having the thin-film layer, that is, the surface on the side to be laminated with the polarizing film.

It is also preferred that out of two protective films of the polarizer, the film other than the optical film is an optically compensatory film having an optically compensatory layer containing an optically anisotropic layer. The optically compensatory film (retardation film) can improve the viewing angle characteristics on the liquid crystal display screen.

A known optically compensatory film may be used but from the standpoint of enlarging the viewing angle, the optically compensatory film described in JP-A-2001-100042 is preferred.

In the case of using the optical film as a surface protective film of a polarizing film (polarizing plate protective film), it is particularly preferred to use a triacetyl cellulose film as the transparent support.

The method for producing the polarizing plate protective film in the present invention includes three methods, that is, (1) a method of coating layers constituting the antireflection layer on one surface of a transparent support which is previously subjected to a saponification treatment, (2) a method of coating the antireflection layer on one surface of a transparent support and applying a saponification treatment to the surface to be laminated with a polarizing film or both surfaces, and (3) a method of coating a part of the antireflection layer on one surface of a transparent support, applying a saponification treatment to the surface to be laminated with a polarizing film or both surfaces, and then coating the remaining layer. In the method of (1), the surface to be coated with the antireflection layer is also hydrophilized, and this makes it difficult to ensure the adherence between the transparent support and the antireflection layer. Therefore, the method of (2) is particularly preferred.

[Polarizing Plate]

The polarizing plate of the present invention is described below. The polarizing plate of the present invention is a polarizing plate having a polarizing film and two protective films for protecting both surfaces of the polarizing film, wherein at lease one protective film is the antireflection film of the present invention.

A configuration where the transparent support of the optical film is adhered to a polarizing film, if desired, through an adhesive layer made from a polyvinyl alcohol and a protective film is also provided on another side of the polarizing film, is preferred. On the surface of another protective film opposite the polarizing film, a pressure-sensitive adhesive layer may be provided.

By virtue of using the optical film of the present invention as a polarizing plate protective film, a polarizing plate excellent in the physical strength, antistatic property and durability can be produced.

The polarizing plate of the present invention can also have an optically compensating function. In this case, it is preferred that out of two surface protective films, the surface protective film only on one surface side of either the front surface or the back surface is formed using the optical film and the surface protective film on the surface of the polarizing plate opposite the side having the optical film is an optically compensatory film.

By producing a polarizing plate where the optical film of the present invention is used for one polarizing plate protective film and an optically compensatory film having optical anisotropy is used for another protective film of the polarizing film, the bright-room contrast and the up/down right/left viewing angle of a liquid crystal display device can be improved.

Furthermore, the image display device of the present invention is characterized by having the antireflection film or polarizing plate of the present invention on the outermost surface of the display.

EXAMPLES

The present invention is described in greater detail below by referring to Examples, but the scope of the present invention should not be construed as being limited thereto. Unless otherwise indicated, the "parts" and "%" are on the mass basis.

Example 1

Preparation Example 1-1

Preparation of Aqueous Solution (A) of Electrically Conductive Polymer 8.0 Gram of 3,4-ethylenedioxythiophene was added to 1,000 ml of a 2 mass % aqueous solution of polystyrenesulfonic acid (molecular weight: about 100,000), and these were mixed at 20° C. The resulting mixed solution was added to 100 ml of an oxidation catalyst solution (containing 15 mass % of ammonium persulfate and 4.0 mass % or ferric sulfate), and reaction was allowed to proceed with stirring at 20° C. for 3 hours.

Subsequently, 1,000 ml of ion-exchanged water was added to the obtained reaction solution, and about 1,000 ml of the solution was removed by an ultrafiltration method. This operation was repeating three times.

Thereafter, 100 ml of an aqueous sulfuric acid solution (10 mass %) and 1,000 ml of ion-exchanged water were added to the obtained solution, and about 1,000 ml of the solution was removed by an ultrafiltration method. Furthermore, 1,000 ml of ion-exchanged water was added to the obtained solution, and about 1,000 ml of the solution was removed by an ultrafiltration method. This operation was repeated 5 times, whereby an aqueous solution containing about 1.1 mass % of PEDOT.PSS (poly(3,4-ethylenedioxythiophene).polystyrenesulfonic acid) was obtained. The solid content concentration was adjusted with ion-exchanged water to form a 1.0 mass % aqueous solution. In this way, Solution (A) of electrically conductive polymer was prepared. Solution (A) is an aqueous solution, and the relative permittivity of water is 80.

Preparation Example 1-2

Preparation of Acetone Solution (B) of Electrically Conductive Polymer

After adding 200 ml of acetone to 200 ml of Aqueous Solution (A) of PEDOT.PSS prepared in Preparation Example 1, 210 ml of acetone was removed by ultrafiltration. This operation was repeated once, and the solid content concentration was adjusted with acetone to prepare a 1.0 mass % water/acetone solution. To 200 ml of this solution, 500 ml of acetone having dissolved therein 2.0 g of trioctylamine was added, and the mixture was stirred with a stirrer for 3 hours. Thereafter, 510 ml of water and acetone were removed by ultrafiltration, and the solid content concentration was adjusted with acetone to form a 1.0 mass % acetone solution. In this way, Solution (B) of electrically conductive polymer was prepared. The water content of this solution was 2 mass %, and the relative permittivity of the solvent was 22.7.

Preparation Example 1-3

Preparation of Methyl Ethyl Ketone Solution (C) of Electrically Conductive Polymer Methyl ethyl ketone (300 ml) was added to 200 ml of Solution (B) of PEDOT.PSS prepared in Preparation Example 1-2, and these were mixed. The mixed solution was concentrated at room temperature under reduced pressure until the total amount became 200 ml, and the solid content was adjusted with methyl ethyl ketone to form a 1.0 mass % methyl ethyl ketone solution. In this way, Solution (C) of electrically conductive polymer (Liquid Dispersion (C)) was prepared. The water content of this solution was 0.05 mass %, and the acetone residual ratio was 1 mass % or less. The relative permittivity of the solvent was 15.5, and the content of the electrically conductive polymer was 50 mass % based on the solid contents contained in the solution.

Preparation Example 2

Preparation of Liquid Dispersion (D) of Electrically Conductive Polymer

Toluene (200 g), 2 g of aniline, 4.2 g of dodecylbenzenesulfonic acid, 1.0 g of polyacrylic acid derivative and 0.03 g of 4-methylaniline were dissolved, and 60 g of distilled water having dissolved therein 3.58 mL of 6 N hydrochloric acid was added thereto.

Furthermore, 180 mg of tetrabutylammonium bromide was added to the mixed solution above, and the mixture was cooled to 5° C. or less. Subsequently, 30 g of distilled water having dissolved therein 5.4 g of ammonium persulfate was added and after performing oxidation polymerization at 5° C. or less for 4 hours, toluene was removed by vacuum distillation.

Thereafter, the polyaniline precipitate was filtered and washed with water to obtain the objective polyaniline. The obtained polyaniline was dispersed in 200 g of toluene and after removing the aqueous layer, the concentration was adjusted to 2 mass % to obtain Toluene Liquid Dispersion (D). (The obtained electrically conductive polymer is a compound where dodecylbenzenesulfonic acid is doped into polyaniline. The relative permittivity of toluene as the solvent is 2.2) The content of the electrically conductive polymer was about 100 mass % based on solid contents contained in the solution.

(Preparation of Coating Solution for Antistatic Layer)

Respective components were mixed as shown in Table 1 below, and the mixture was dissolved in a mixed solvent of methyl ethyl ketone (MEK) and isopropyl alcohol (IPA) to prepare Coating Solutions HC1 to HC14 for antistatic layer having a solid content concentration of 30 mass %.

(isopropyl alcohol silica sol, CS60-IPA, produced by Catalysts & Chemicals Ind. Co., Ltd., average particle diameter: 60 nm, thickness of shell: 10 nm, silica concentration: 20%, refractive index of silica particle: 1.31), and these were mixed. Subsequently, 9 parts of ion-exchanged water was added thereto, and the reaction was allowed to proceed at 60° C. for 8 hours. The reaction solution was cooled to room temperature, and 1.8 parts of acetyl acetone was added to obtain Liquid Dispersion (E). Thereafter, solvent replacement by reduced-pressure distillation was performed under a pressure of 30 Torr while adding cyclohexanone to keep the silica content almost constant, and finally the concentration was adjusted to obtain Liquid Dispersion (F) having a solid content concentration of 18.2%. The amount of IPA remaining in the obtained liquid dispersion was analyzed by gas chromatography and found to be 0.5% or less.

TABLE 1

| Coating Solution No. | Liquid Dispersion of Electrically Conductive Polymer Kind | Amount (mass %) | Polyfunctional Monomer Kind | Amount (mass %) | Initiator Kind | Amount (mass %) | Additive Kind | Amount (mass %) | Diluting Solvent | Remarks |
|---|---|---|---|---|---|---|---|---|---|---|
| HC1 | Liquid Dispersion C | 6 | DPHA | 91 | Irg. 127 | 3 | — | — | MEK(30)/IPA(70) | Comparative Example |
| HC2 | Liquid Dispersion C | 25 | DPHA | 72 | Irg. 127 | 3 | — | — | MEK(30)/IPA(70) | Comparative Example |
| HC3 | Liquid Dispersion C | 6 | DPHA | 90.5 | Irg. 127 | 3 | hydroquinone | 0.5 | MEK(30)/IPA(70) | Comparative Example |
| HC4 | Liquid Dispersion C | 6 | DPHA | 90.5 | Irg. 127 | 3 | Compound (PH-1) | 0.5 | MEK(30)/IPA(70) | Invention |
| HC5 | Liquid Dispersion C | 6 | DPHA | 90.5 | Irg. 127 | 3 | Compound (PH-16) | 0.5 | MEK(30)/IPA(70) | Invention |
| HC6 | Liquid Dispersion C | 6 | DPHA | 90.5 | Irg. 127 | 3 | Compound (PH-19) | 0.5 | MEK(30)/IPA(70) | Invention |
| HC7 | Liquid Dispersion C | 6 | DPHA | 90.5 | Irg. 127 | 3 | Compound (PH-31) | 0.5 | MEK(30)/IPA(70) | Invention |
| HC8 | Liquid Dispersion C | 6 | DPHA | 90.5 | Irg. 127 | 3 | Compound (PH-35) | 0.5 | MEK(30)/IPA(70) | Invention |
| HC9 | Liquid Dispersion C | 6 | DPHA | 88.5 | Irg. 127 | 3 | Compound (PA-4) | 2 | MEK(30)/IPA(70) | Invention |
| HC10 | Liquid Dispersion C | 6 | DPHA | 88.5 | Irg. 127 | 3 | Compound (PA-13) | 2 | MEK(30)/IPA(70) | Invention |
| HC11 | Liquid Dispersion C | 6 | DPHA | 88.5 | Irg. 127 | 3 | Compound (HX-5) | 2 | MEK(30)/IPA(70) | Invention |
| HC12 | Liquid Dispersion C | 6 | DPHA | 88.5 | Irg. 127 | 3 | Compound (HX-11) | 2 | MEK(30)/IPA(70) | Invention |
| HC13 | Liquid Dispersion D | 3 | DPHA | 93.5 | Irg. 127 | 3 | — | — | MEK(30)/IPA(70) | Comparative Example |
| HC14 | Liquid Dispersion D | 3 | DPHA | 93.5 | Irg. 127 | 3 | Compound (PH-19) | 0.5 | MEK(30)/IPA(70) | Invention |

Compounds used are as follows.

DPHA: A mixture of dipentaerythritol pentaacrylate and dipentaerythritol hexaacrylate (produced by Nippon Kayaku Co., Ltd.)

Irg. 127: Photopolymerization initiator Irgacure 127 (produced by Ciba Specialty Chemicals Corp.)

(Preparation of Liquid Dispersion (F) of Hollow Silica Particle)

20 Parts of acryloyloxypropyltrimethoxysilane and 1.5 parts of diisopropoxyaluminum ethyl acetate were added to 500 parts of a fine particle sol of hollow silica particle (Preparation of Coating Solution for Low Refractive Index Layer)

Respective components were mixed as shown in Table 2, and the mixture was dissolved in MEK to produce a coating solutions for low refractive index layer having a solid content of 5%.

TABLE 2

| Coating Solution No. | Binder | | | | Polymerization Initiator | | RMS-033 | Hollow Silica Liquid Dispersion (F) |
|---|---|---|---|---|---|---|---|---|
| | Kind | Amount (mass %) | Kind | Amount (mass %) | Kind | Amount (mass %) | (amount, mass %) | (amount, mass %) |
| Ln1 | P-1 | 28 | DPHA | 10 | Irg. 127 | 3 | 4 | 55 |
| Ln2 | DPHA | 38 | — | — | Irg. 127 | 3 | 4 | 55 |

Abbreviations in the Table above are as follows.

"P-1": Fluorine-Containing Copolymer P-3 (weight average molecular weight: about 50,000) described in JP-A-2004-45462

DPHA: A mixture of dipentaerythritol pentaacrylate and dipentaerythritol hexaacrylate, produced by Nippon Kayaku Co., Ltd.

Irg. 127: Irgacure 127, a polymerization initiator (produced by Ciba Japan)

RMS-033: Methacryloxy-modified silicone (produced by Gelest)

(Production of Antistatic Layer)

On a triacetyl cellulose film (TD80UF, produced by Fujifilm Corp., refractive index: 1.48) having a thickness of 80 μm as a transparent support, the coating solution for antistatic layer prepared above was coated using a gravure coater and dried at 60° C. for about 1 minute. Thereafter, the coated layer was cured by irradiating an ultraviolet ray at an illuminance of 400 mW/cm$^2$ and an irradiation dose of 120 mJ/cm$^2$ with use of an air-cooled metal halide lamp (manufactured by Eye Graphics Co., Ltd.) of 160 W/cm while purging the system with nitrogen to give an atmosphere having an oxygen concentration of 1.0 vol % or less, whereby an antistatic layer having a thickness of 5 μm was formed. In this way, optical films (Sample Nos. 1 to 14) were produced.

(Production of Low Refractive Index Layer)

The coating solution for low refractive index layer was coated using a gravure coater on the antistatic layer produced above. The drying conditions of the low refractive index layer were 60° C. and 60 seconds, and the ultraviolet curing conditions were such that an air-cooled metal halide lamp (manufactured by Eye Graphics Co., Ltd.) of 240 W/cm was used at an illuminance of 600 mW/cm$^2$ and an irradiation dose of 600 mJ/cm$^2$ while purging the system with nitrogen to give an atmosphere having an oxygen concentration of 0.01 vol % or less. In this way, optical films (antireflection films) in which a low refractive index layer was formed on the antistatic layer were produced (Sample Nos. 15 and 16).

(Evaluation of Optical Film)

Various characteristics of the optical film were evaluated by the following methods. The results are shown in Table 3.

(1) Measurement of Surface Resistance Value

The sample was left standing under the conditions of 25° C. and 60% RH for 2 hours and then measured using an ultra-insulating resistance/microammeter, TR8601 (manufactured by Advantest Corp.). The common logarithm (log SR) of the surface resistance value is shown.

(2) Evaluation of Pencil Hardness

As an index of scratch resistance, the pencil hardness evaluation described in JIS K 5400 was performed. The antireflection film was subjected to moisture conditioning at a temperature of 25° C. and a humidity of 60% RH for 2 hours and then evaluated using a pencil for test prescribed in JIS S 6006. In the present invention, the pencil hardness is preferably 4H or more.

(3) Transmittance

The transmittance of light at 550 nm was measured using an UV/vis spectrometer (Shimadzu U2400). The measurement is preferably 90% or more, more preferably 92% or more.

(4) Evaluation of Surface Roughness

Oil-based black ink was applied to the back side of the sample, and the surface roughness was evaluated by visually observing the sample under sunlight source according to the following criteria.

A: Roughness of the film surface cannot be recognized even when carefully checked.

B: Roughness of the film surface is recognized when carefully checked but is not annoying.

C: The film surface is slightly roughened, and the roughness is annoying.

D: Roughness of the film surface is recognized at a glance and is very annoying.

(5) Light Resistance Test

Light was irradiated at an output of 180 W/m$^2$ for 50 hours by using a super xenon weather meter, SX-75 (manufactured by Suga Test Instruments Co., Ltd.), and then, the surface resistance value was measured by the method described above.

(6) Heat Resistance Test

In the heat resistance test, the sample was aged in an environment at a temperature of 105° C. and a humidity of 10% RH for 250 hours and then, the surface resistance value was measured by the method described above.

After the light resistance test and heat resistance test in (5) and (6), in view of dust-proof performance, the surface resistance value Log SR is preferably 13 or less, more preferably from 5 to 12, still more preferably from 7 to 12, yet still more preferably from 8 to 11.

(7) Integrated Reflectance

The integrated reflectance was measured with a spectral photometer, V-550 (manufactured by JASCO Corp.), after roughening the back surface (surface not having an optical functional layer) of the optical film with sand paper to eliminate the reflection on the back surface and then treating the back surface with black ink, and an average reflectance in the range of 450 to 650 nm was calculated and used for the evaluation of antireflection performance.

TABLE 3

| Sample No. | Antistatic Layer Coating Solution | Thickness | Low Refractive Index Layer Coating Solution | Thickness | Transmittance (%) | Pencil Hardness | Integrated Reflectance (%) | Surface Resistance Value (Ω/sq.) Before Light Irradiation | After Light Irradiation | Before Heat Treatment | After Thermal Aging | |
|---|---|---|---|---|---|---|---|---|---|---|---|---|
| 1 | HC1 | 5 μm | — | — | 92.1 | 3H | 4.7 | 7.9 | 14.3 | 7.9 | 12.2 | Comparative Example |
| 2 | HC2 | 5 μm | — | — | 87.2 | B | 4.7 | 4.7 | 12.1 | 4.7 | 10.5 | Comparative Example |
| 3 | HC3 | 5 μm | — | — | not cured | — | — | — | — | — | — | Comparative Example |
| 4 | HC4 | 5 μm | — | — | 92.1 | 3H | 4.7 | 7.3 | 11.8 | 7.3 | 9.7 | Invention |
| 5 | HC5 | 5 μm | — | — | 92.1 | 3H | 4.7 | 7 | 11.2 | 7 | 9.2 | Invention |
| 6 | HC6 | 5 μm | — | — | 92.1 | 3H | 4.7 | 6.6 | 8 | 6.6 | 6.7 | Invention |
| 7 | HC7 | 5 μm | — | — | 92.1 | 3H | 4.7 | 6.6 | 7.8 | 6.6 | 6.6 | Invention |
| 8 | HC8 | 5 μm | — | — | 92.1 | 3H | 4.7 | 6.6 | 7.8 | 6.6 | 6.6 | Invention |
| 9 | HC9 | 5 μm | — | — | 92.1 | 3H | 4.7 | 7.3 | 11.8 | 7.3 | 10.3 | Invention |
| 10 | HC10 | 5 μm | — | — | 92.1 | 3H | 4.7 | 7.1 | 11.6 | 7.1 | 9.5 | Invention |
| 11 | HC11 | 5 μm | — | — | 92.1 | 3H | 4.7 | 7.2 | 11.3 | 7.2 | 10 | Invention |
| 12 | HC12 | 5 μm | — | — | 92.1 | 3H | 4.7 | 7.2 | 10.9 | 7.2 | 9.2 | Invention |
| 13 | HC13 | 5 μm | — | — | 90.2 | 3H | 4.7 | 8.3 | 15.1 | 8.3 | 13.2 | Comparative Example |
| 14 | HC14 | 5 μm | — | — | 90.2 | 3H | 4.7 | 7.5 | 10.9 | 7.5 | 8.8 | Invention |
| 15 | HC6 | 5 μm | Ln1 | 90 nm | 94.5 | 3H | 1.5 | 8.5 | 9.8 | 8.5 | 8.6 | Invention |
| 16 | HC6 | 5 μm | Ln2 | 90 nm | 93.7 | 3H | 1.9 | 8.5 | 9.8 | 8.5 | 8.6 | Invention |

As seen from the results above, the optical film having an antistatic layer containing (A) an electrically conductive polymer, (B) a polyfunctional monomer having two or more polymerizable groups, and (C) at least one kind of a compound selected from the compound (1), the compound (2) and the compound (3) is assured of strong coat strength, excellent in the transparency and antistatic property and at the same time, excellent in the heat resistance and light resistance. Also, as for the optical film where a low refractive index is further stacked on the antistatic layer, a film having low reflectance and causing little disturbing reflection can be obtained.

Example 2

Preparation of Coating Solution for Antistatic Layer

Respective components were mixed as shown in Table 4 below, and the mixture was dissolved in a mixed solvent of methyl ethyl ketone and IPA to prepare Coating Solutions HC15 and HC16 for antistatic layer having a solid content concentration of 30 mass %.

TABLE 4

| Coating Solution No. | Electrically Conductive Polymer Liquid Dispersion Kind | Amount (mass %) | Polyfunctional Monomer Kind | Amount (mass %) | Initiator Kind | Amount (mass %) | Additive Kind | Amount (mass %) | Surfactant Kind | Amount (mass %) | Diluting Solvent | Remarks |
|---|---|---|---|---|---|---|---|---|---|---|---|---|
| HC6 | Liquid Dispersion C | 6 | DPHA | 90.5 | Irg. 127 | 3 | Compound (PH-19) | 0.5 | — | — | MEK(30)/IPA(70) | Invention |
| HC15 | Liquid Dispersion C | 6 | DPHA | 90 | Irg. 127 | 3 | Compound (PH-19) | 1 | — | — | MEK(30)/IPA(70) | Invention |

TABLE 4-continued

| | Content (solid content) | | | | | | | | | | |
|---|---|---|---|---|---|---|---|---|---|---|---|
| | Electrically Conductive Polymer Liquid Dispersion | | Polyfunctional Monomer | | Initiator | | Additive | | Surfactant | | |
| Coating Solution No. | Kind | Amount (mass %) | Kind | Amount (mass %) | Kind | Amount (mass %) | Kind | Amount (mass %) | Kind | Amount (mass %) | Diluting Solvent | Remarks |
| HC16 | Liquid Dispersion C | 6 | DPHA | 90 | Irg. 127 | 3 | Compound (PH-19) | 1 | FP1 | 0.1 | MEK(30)/ IPA(70) | Invention |

In the Table, the abbreviation is as follows. "FP-1": A fluorine-containing surfactant represented by the following structural formula.

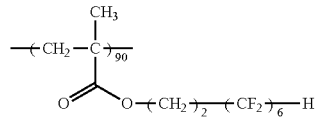

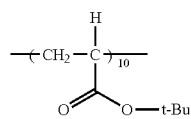

FP-1
Mw: 14000

(Production of Optical Film)
Sample Nos. 17 and 18 were produced in the same manner as Sample No. 1 of Example 1 except for changing the coating solution for antistatic layer to HC15 and HC16.

(Evaluation of Optical Film)
Various characteristics of the optical film were evaluated by the same methods as above. The results are shown in Table 5.

TABLE 5

| | Antistatic Layer | | | | | | | Surface Resistance (Ω/sq.) | | |
| | | | | | Integrated | | Before | After | Before | After |
| Sample No. | Coating Solution | Thickness | Transmittance (%) | Pencil Hardness | Reflectance (%) | Surface Roughness | Light Irradiation | Light Irradiation | Heat Treatment | Thermal Aging |
| 6 | HC6 | 5 μm | 92.1 | 3H | 4.7 | B | 6.6 | 8 | 6.6 | 6.7 |
| 17 | HC15 | 5 μm | 92.1 | 3H | 4.7 | C | 6.3 | 7.1 | 6.3 | 6.3 |
| 18 | HC16 | 5 μm | 92.1 | 3H | 4.7 | A | 6.3 | 7.1 | 6.3 | 6.3 |

As seen from the results above, by further adding a surfactant to the antistatic layer containing (A) an electrically conductive polymer, (B) a polyfunctional monomer having two or more polymerizable groups, and (C) at least one kind of a compound selected from the compound (1), the compound (2) and the compound (3), high antistatic property can be realized while keeping a very good surface state.

Example 3

An optical film was produced in the same manner as Sample 6 of Example 1 except that a coating solution using Compound (PA-13) in a ratio of 2% or Compound (HX-11) in a ratio of 2% in addition to Compound (PH-19) in Coating Solution HC6 for Antistatic Layer was used. When these samples were evaluated, an optical film more excellent in the antistatic property, heat resistance and light resistance than those using the compound (PH-19), (PA-13) or (HX-11) alone was obtained.

Example 4

Sample Nos. 19 and 20 were produced in the same manner as Sample 1 of Example 1 except for changing the coating solution for antistatic layer to the solution shown in the Table below and applying the coating solution to have a film thickness of 12 μm after curing. These samples were evaluated in accordance with Example 1.

TABLE 6

| | Content (solid content) | | | | | | | |
|---|---|---|---|---|---|---|---|---|
| | Electrically Conductive Polymer | | Polyfunctional Monomer | | | | Initiator | |
| | Kind | Amount (mass %) | Kind | Amount (mass %) | Kind | Amount (mass %) | Kind | Amount (mass %) | Remarks |
| HC17 | Liquid Dispersion C | 3 | PET-30 | 43.5 | Viscoat 360 | 43.5 | Irg. 127 | 3 | Comparative Example |
| HC18 | Liquid Dispersion C | 3 | PET-30 | 43.5 | Viscoat 360 | 43.5 | Irg. 127 | 3 | Invention |

| | Content (solid content) | | | | | |
|---|---|---|---|---|---|---|
| | Translucent Particle | | Additive | | | |
| | Kind | Amount (mass %) | Kind | Amount (mass %) | Diluting Solvent | Remarks |
| HC17 | 8 μm crosslinked acrylic styrene particle | 7 | — | — | MEK(30)/IPA(70) | Comparative Example |
| HC18 | 8 μm crosslinked acrylic styrene particle | 7 | Compound (PH-19) | 0.5 | MEK(30)/IPA(70) | Invention |

TABLE 7

| | Antistatic Layer | | | | | Surface Resistance Value (Ω/sq.) | | | | |
|---|---|---|---|---|---|---|---|---|---|---|
| Sample No. | Coating Solution | Thickness | Transmittance (%) | Pencil Hardness | Integrated Reflectance (%) | Before Light Irradiation | After Light Irradiation | Before Heat Treatment | After Thermal Aging | |
| 19 | HC17 | 12 μm | 91.5 | 3H | 4.6 | 7.9 | 14.8 | 7.9 | 12.4 | Comparative Example |
| 20 | HC18 | 12 μm | 91.5 | 3H | 4.6 | 6.6 | 7.8 | 6.6 | 6.7 | Invention |

As seen above, Sample No. 20 containing a translucent particle in the antistatic layer was assured of strong coat strength, excellent in the transparency and antistatic property and at the same time, excellent in the heat resistance and light resistance, and thanks to its antiglare property, this was a film causing little disturbing reflection.

The compounds used in the Table are as follows.
PET-30:
A mixture of pentaerythritol triacrylate and pentaerythritol tetraacrylate [produced by Nippon Kayaku Co., Ltd.].
Viscoat 360:
Trimethylolpropane PO-modified triacrylate [produced by Osaka Organic Chemical Industry Ltd.]
8-μm Crosslinked polystyrene particle (30%):
An MIBK liquid dispersion obtained by dispersing a crosslinked polystyrene particle having an average particle diameter of 8.0 μm [produced by Sekisui Chemical Co., Ltd.] in a polytron dispersing machine at 10,000 rpm for 20 minutes; refractive index: 1.55.

Example 5

Preparation of Coating Solution HC-A for Hardcoat Layer

10 Parts by mass of MEK and 40 parts by mass of MIBK were added to 47 parts by mass of caprolactone-modified dipentaerythritol hexaacrylate (DPCA-120, produced by Nippon Kayaku Co., Ltd.) and 3 parts by mass of Irg. 127 (polymerization initiator, produced by Ciba Japan), and the mixture was stirred until these were dissolved. The obtained solution was filtered through a polypropylene-made filter having a pore size of 5 μm to prepare Coating Solution HC-A for hardcoat layer.

(Preparation of Coating Solution HC-19 for Antistatic Layer)

Coating Solution HC-19 for Antistatic Layer was prepared in the same manner as in Example 1 except that the amount of Electrically Conductive Polymer Liquid Dispersion C in Coating Solution HC-6 for Antistatic Layer 19 was reduced to one-third.

(Production of Antistatic Layer)

Sample Nos. 6, 21 and 22 were produced in the same manner as Sample No. 1 of Example 1 except that the coating solution for antistatic layer was changed to the solution shown in the Table below and applied to give a film thickness of 5 μm, 15 μm, and 15 μm, respectively, after curing.

Also, using Coating Solution HC-A for Hardcoat Layer and Coating Solution HC-6 for Antistatic Layer, Coating Solution HC-A for Hardcoat Layer and Coating Solution HC-6 for Antistatic were coated by a composite coater having a slot die in one layer and a slide in one layer to have a dry film thickness of 10 μm and 5 μm, respectively, by appropriately adjusting the wet coated amount while conveying the web at a speed of 30 m/min and then dried at 100° C. for 2 minutes. Thereafter, ultraviolet rays were irradiated thereon at an illuminance of 600 mW/cm$^2$ and an irradiation dose of 600 mJ/cm$^2$ by using an air-cooled metal halide lamp (manufactured by Eye Graphics Co., Ltd.) of 240 W/cm while purging the system with nitrogen to give an atmosphere having an oxygen concentration of 0.01 vol % or less, whereby the coated layers were cured. In this way, Sample No. 23 was produced. The evaluations were performed in accordance with Example 1.

TABLE 8

| Hardcoat Layer | | Antistatic Layer | | | | |
|---|---|---|---|---|---|---|
| | | | Electrically | | Amount of Electrically | |
| Coating Solution | Film Thickness | Coating Solution | Conductive Polymer Dispersion Content (%) | Film Thickness | Conductive Polymer Dispersion Coated (g/m²) | Transmittance (%) |
| 6 — | — | HC6 | 6 | 5 μm | 0.3 | 92.1 |
| 21 — | — | HC6 | 6 | 15 μm | 0.9 | 88.6 |
| 22 — | — | HC19 | 2 | 15 μm | 0.3 | 92.1 |
| 23 HC-A | 10 μm | HC6 | 6 | 5 μm | 0.3 | 92.1 |

| | | | Surface Resistance Value (Ω/sq.) | | | | |
|---|---|---|---|---|---|---|---|
| | Pencil Hardness | Integrated Reflectance (%) | Before Light Irradiation | After Light Irradiation | Before Heat Treatment | After Thermal Aging | |
| 6 | 3H | 4.7 | 6.6 | 8 | 6.6 | 6.7 | Invention |
| 21 | 5H | 4.7 | 5.4 | 7.1 | 5.4 | 5.4 | Invention |
| 22 | 5H | 4.7 | 8.1 | 9.6 | 8.1 | 8.5 | Invention |
| 23 | 5H | 4.7 | 6.6 | 8 | 6.6 | 6.7 | Invention |

As seen from the results above, thanks to the two-layer configuration of a hardcoat layer/an antistatic layer, a coating film assured of strong coat strength, excellent in the transparency and antistatic property and at the same time, excellent in the heat resistance and light resistance can be obtained. Since such a coating film can efficiently exhibit electrical conductivity with a small amount of electrically conductive polymer, so that the amount of the electrically conductive polymer used can be reduced.

Furthermore, by utilizing a method of simultaneously coating and forming two layers in one coating step, the number of coating steps can be decreased, and low cost and high productivity can be realized.

Example 6

Evaluation in Liquid Crystal Display Device (Production of Polarizing Plate)

A triacetyl cellulose film having a thickness of 80 μm (TAC-TD80U, produced by Fujifilm Corp.) which had been dipped in an aqueous 1.5 mol/L NaOH solution at 55° C. for 2 minutes, then neutralized and washed, and the optical film (saponified) of Examples and Comparative Examples were adhered to and caused to protect both surfaces of a polarizer produced by adsorbing iodine to a polyvinyl alcohol and stretching it.

(Fabrication of Liquid Crystal Display Device)

The polarizing plate and the retardation film provided in a VA-type liquid crystal display device (LC-37GS10, manufactured by Sharp Corp.) were removed, and the polarizing plate produced above was instead laminated by arranging its transmission axis to agrees with that of the polarizing plate originally laminated to the commercial product, whereby liquid crystal display devices having the optical film of Examples and Comparative Example were fabricated. Incidentally, the optical film was laminated to lie on the viewing side.

In the thus-produced polarizing plate and image display device each with the optical film of Examples, similarly to respective optical films laminated, a good surface state free of streak or unevenness and excellent scratch resistance, antifouling property, dust-proof performance and adherence were exhibited as compared with Comparative Examples.

Also, in the polarizing plate and image display device each with an optical film where a low refractive index is stacked or with an optical film where antiglare property is imparted, significantly reduced disturbing reflection of background and very high display quality were achieved.

What is claimed is:

1. An optical film comprising:
   a transparent support and at least one antistatic layer formed from a composition comprising at least the following (A) to (D):
   (A) an electrically conductive polymer,
   (B) a polyfunctional monomer having two or more polymerizable groups,
   (C) at least one compound selected from a compound represented by the following formula (1), a compound represented by the following formula (2) and a trivalent phosphorus compound, and
   (D) a photopolymerization initiator:

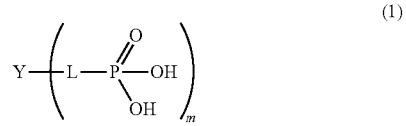

(1)

wherein, in the formula (1), Y represents an m-valent group selected from a hydrogen atom, a carbon atom, a heteroatom, a hydroxy group, a mercapto group, a substituted or unsubstituted group derived from an amino group, a substituted or unsubstituted group derived from an alkyl group, a substituted or unsubstituted group derived from an acyl group, a substituted or unsubstituted group derived from an aryl group, a substituted or unsubstituted group derived from an alkoxy group, a substituted or unsubstituted group derived from an aryloxy group and a substituted or unsubstituted group derived from a heteroaryl group, L represents a single bond, a substituted or unsubstituted divalent hydrocarbon group, and a substituted or unsubstituted divalent heteroatom or a substituted or unsubstituted imino group; and

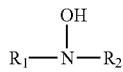
(2)

wherein, in the formula (2), $R_1$ represents a hydrogen atom, an alkyl group, an acyl group, an aryl group, an alkoxy group, an aryloxy group or a heteroaryl group, $R_2$ represents a hydrogen atom, an alkyl group, an aryl group, a heteroaryl group or a sulfonyl group, and the alkyl group, acyl group, aryl group, alkoxy group, aryloxy group, heteroaryl group and sulfonyl group each may have a substituent; and wherein, in the formula (1), m represents an integer of 3 or more.

2. The optical film as claimed in claim 1, wherein a common logarithmic value of a surface resistivity (Ω/sq) of the optical film is from 6 to 12.

3. The optical film as claimed in claim 1, wherein the electrically conductive polymer comprises at least one of polythiophene, polyaniline, polypyrrole and derivatives thereof.

4. The optical film as claimed in claim 1, wherein the electrically conductive polymer comprises at least one of polythiophene and derivatives thereof.

5. The optical film as claimed in claim 1, wherein the electrically conductive polymer comprises poly(3,4-ethylenedioxy)thiophene.

6. The optical film as claimed in claim 1, wherein the composition further comprises a polystyrenesulfonic acid as a dopant of the electrically conductive polymer.

7. The optical film as claimed in claim 1, wherein the compound represented by the formula (1) is a phosphonic acid compound.

8. The optical film as claimed in claim 1, wherein the compound represented by the formula (2) comprises at least one compound selected from a hydroxamic acid compound and a hydroxyamine compound.

9. The optical film as claimed in claim 1, wherein the trivalent phosphorus compound is a compound represented by the following formula (I), (II), (III) or (IV):

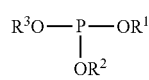
(I)

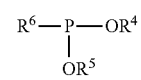
(II)

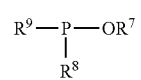
(III)

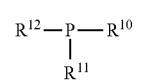
(IV)

wherein each of $R^1$, $R^2$, $R^3$, $R^4$, $R^5$, $R^6$, $R^7$, $R^8$, $R^9$, $R^{10}$, $R^{11}$ and $R^{12}$ independently represents a hydrogen atom, a substituted or unsubstituted alkyl group, a substituted or unsubstituted aryl group or a substituted or unsubstituted heteroaryl group.

10. The optical film as claimed in claim 1, wherein the polymerizable group of the polyfunctional monomer having two or more polymerizable groups is selected from a substituted or unsubstituted acryloyl group, a substituted or unsubstituted methacryloyl group and —C(O)OCH=CH$_2$.

11. The optical film as claimed in claim 1, wherein the composition further comprises a fluorine-containing or silicon-containing surfactant.

12. The optical film as claimed in claim 1, wherein the composition comprises the compound represented by the formula (1) and the compound represented by the formula (2).

13. The optical film as claimed in claim 1, wherein the composition comprises the compound represented by the formula (1) and the trivalent phosphorus compound.

14. The optical film as claimed in claim 1, wherein the antistatic layer comprises a translucent particle having an average particle diameter of from 0.5 to 20 µm on volume basis.

15. The optical film as claimed in claim 1 which is an antireflection film and further comprises a low refractive index layer which is provided on the antistatic layer directly or through another layer.

16. A polarizing plate comprising an optical film as a protective film, wherein the optical film comprises:
a transparent support and at least one antistatic layer formed from a composition comprising at least the following (A) to (D):
(A) an electrically conductive polymer,
(B) a polyfunctional monomer having two or more polymerizable groups,
(C) at least one compound selected from a compound represented by the following formula (1), a compound represented by the following formula (2) and a trivalent phosphorus compound, and
(D) a photopolymerization initiator:

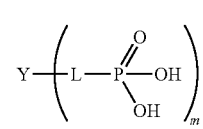
(1)

wherein, in the formula (1), Y represents an m-valent group selected from a hydrogen atom, a carbon atom, a heteroatom, a hydroxy group, a mercapto group, a substituted or unsubstituted group derived from an amino group, a substituted or unsubstituted group derived from an alkyl group, a substituted or unsubstituted group derived from an acyl group, a substituted or unsubstituted group derived from an aryl group, a substituted or unsubstituted group derived from an alkoxy group, a substituted or unsubstituted group derived from an aryloxy group and a substituted or unsubstituted group derived from a heteroaryl group, L represents a single bond, a substituted or unsubstituted divalent hydrocarbon group, and a substituted or unsubstituted divalent heteroatom or a substituted or unsubstituted imino group;

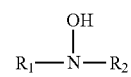
(2)

wherein, in the formula (2), $R_1$ represents a hydrogen atom, an alkyl group, an acyl group, an aryl group, an alkoxy group, an aryloxy group or a heteroaryl group, $R_2$ represents a hydrogen atom, an alkyl group, an aryl group, a heteroaryl group or a sulfonyl group, and the alkyl group, acyl group, aryl group, alkoxy group, aryloxy group, heteroaryl group and sulfonyl group each may have a substituent; and wherein, in the formula (1), m represents an integer of 3 or more.

17. An image display device comprising an optical film at an outermost surface of the display, wherein the optical film comprises:

a transparent support and at least one antistatic layer formed from a composition comprising at least the following (A) to (D):

(A) an electrically conductive polymer,
(B) a polyfunctional monomer having two or more polymerizable groups,
(C) at least one compound selected from a compound represented by the following formula (1), a compound represented by the following formula (2) and a trivalent phosphorus compound, and
(D) a photopolymerization initiator:

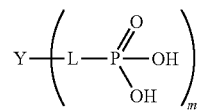

(1)

wherein, in the formula (1), Y represents an m-valent group selected from a hydrogen atom, a carbon atom, a heteroatom, a hydroxy group, a mercapto group, a substituted or unsubstituted group derived from an amino group, a substituted or unsubstituted group derived from an alkyl group, a substituted or unsubstituted group derived from an acyl group, a substituted or unsubstituted group derived from an aryl group, a substituted or unsubstituted group derived from an alkoxy group, a substituted or unsubstituted group derived from an aryloxy group and a substituted or unsubstituted group derived from a heteroaryl group, L represents a single bond, a substituted or unsubstituted divalent hydrocarbon group, and a substituted or unsubstituted divalent heteroatom or a substituted or unsubstituted imino group;

wherein, in the formula (2), $R_1$ represents a hydrogen atom, an alkyl group, an acyl group, an aryl group, an alkoxy group, an aryloxy group or a heteroaryl group, $R_2$ represents a hydrogen atom, an alkyl group, an aryl group, a heteroaryl group or a sulfonyl group, and the alkyl group, acyl group, aryl group, alkoxy group, aryloxy group, heteroaryl group and sulfonyl group each may have a substituent; and wherein, in the formula (1), m represents an integer of 3 or more.

* * * * *